May 11, 1954 T. B. MARTIN ET AL 2,678,103
PROPELLER PITCH CONTROL
Filed June 27, 1945 11 Sheets-Sheet 5
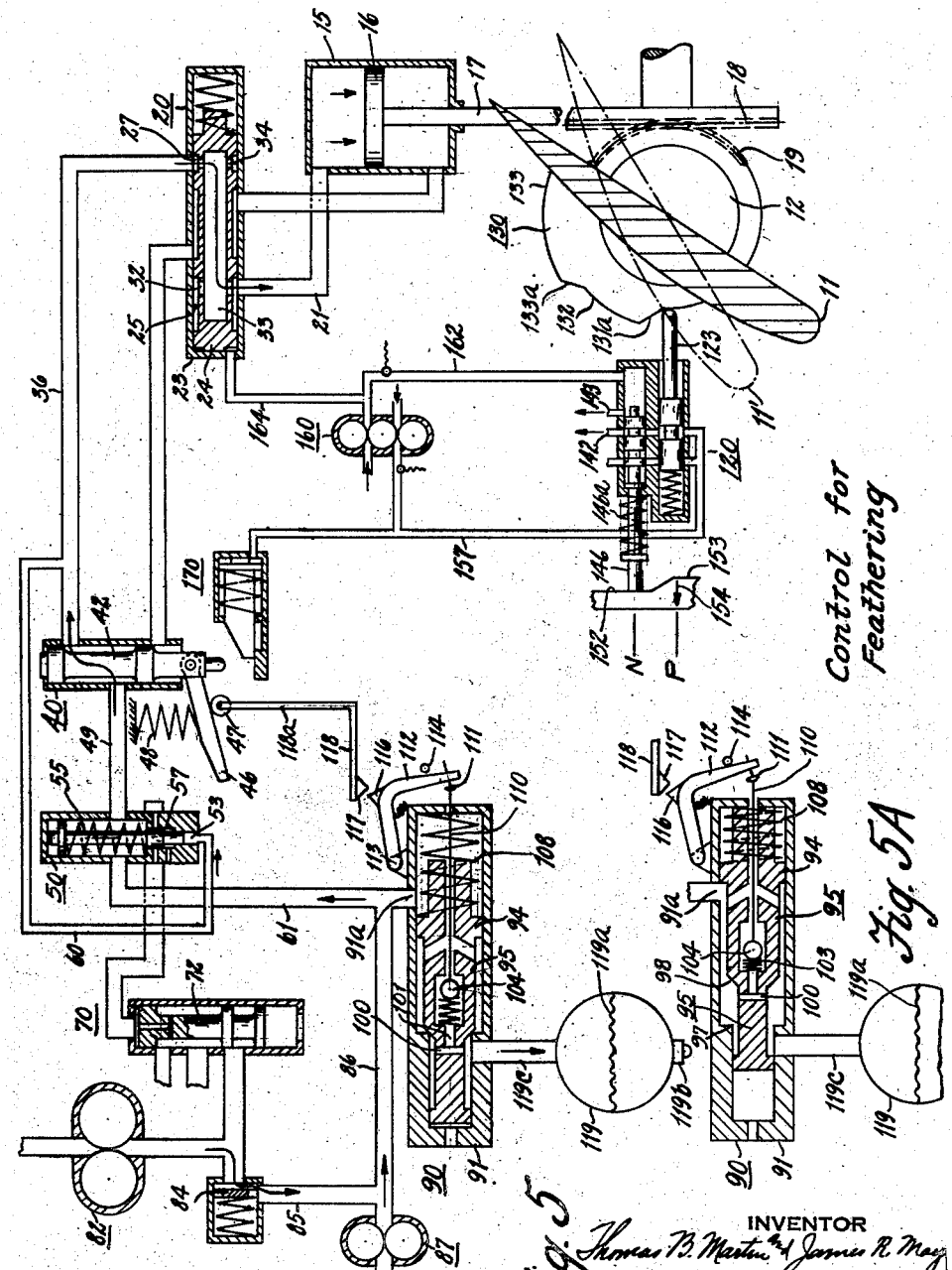

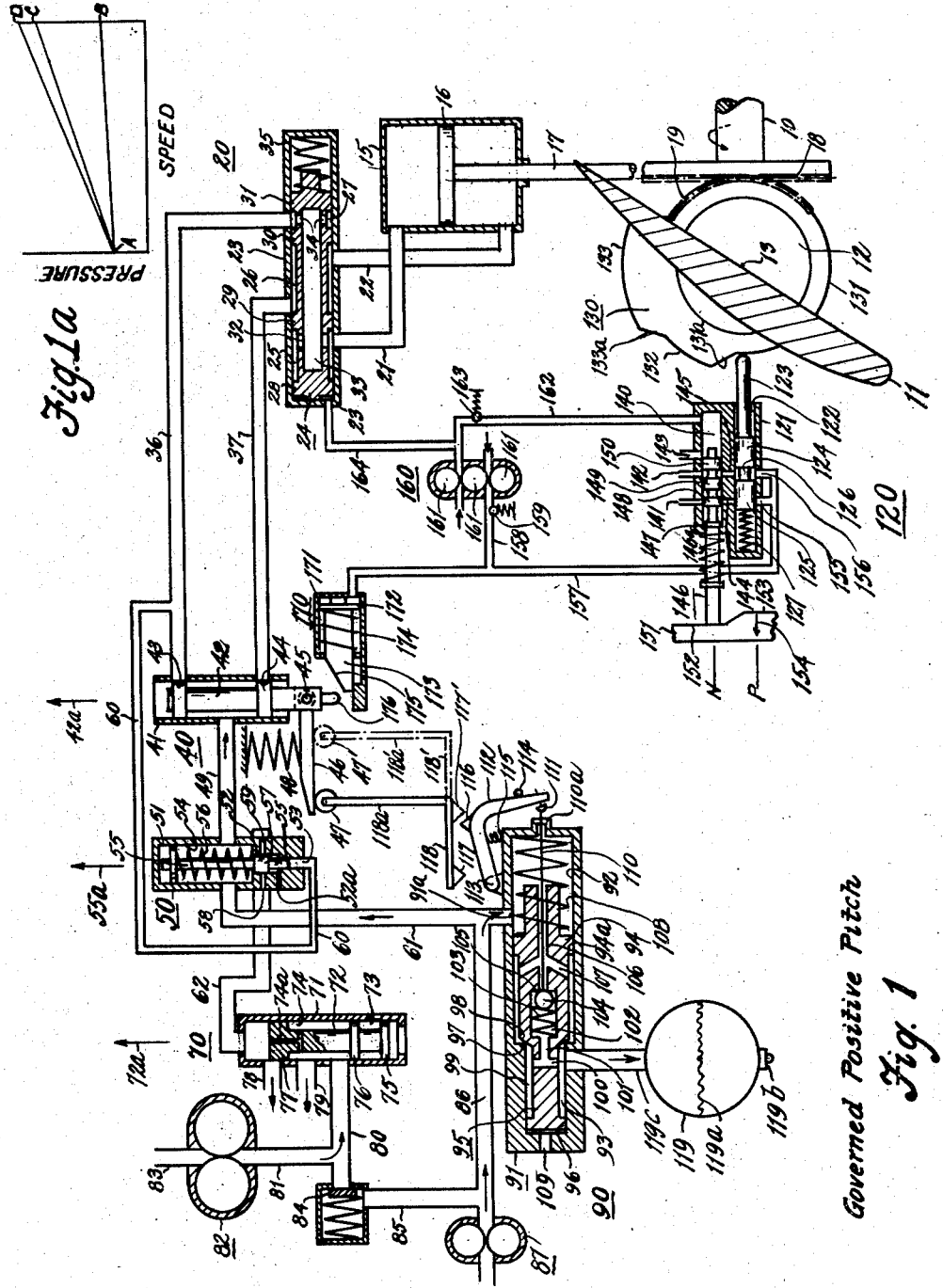

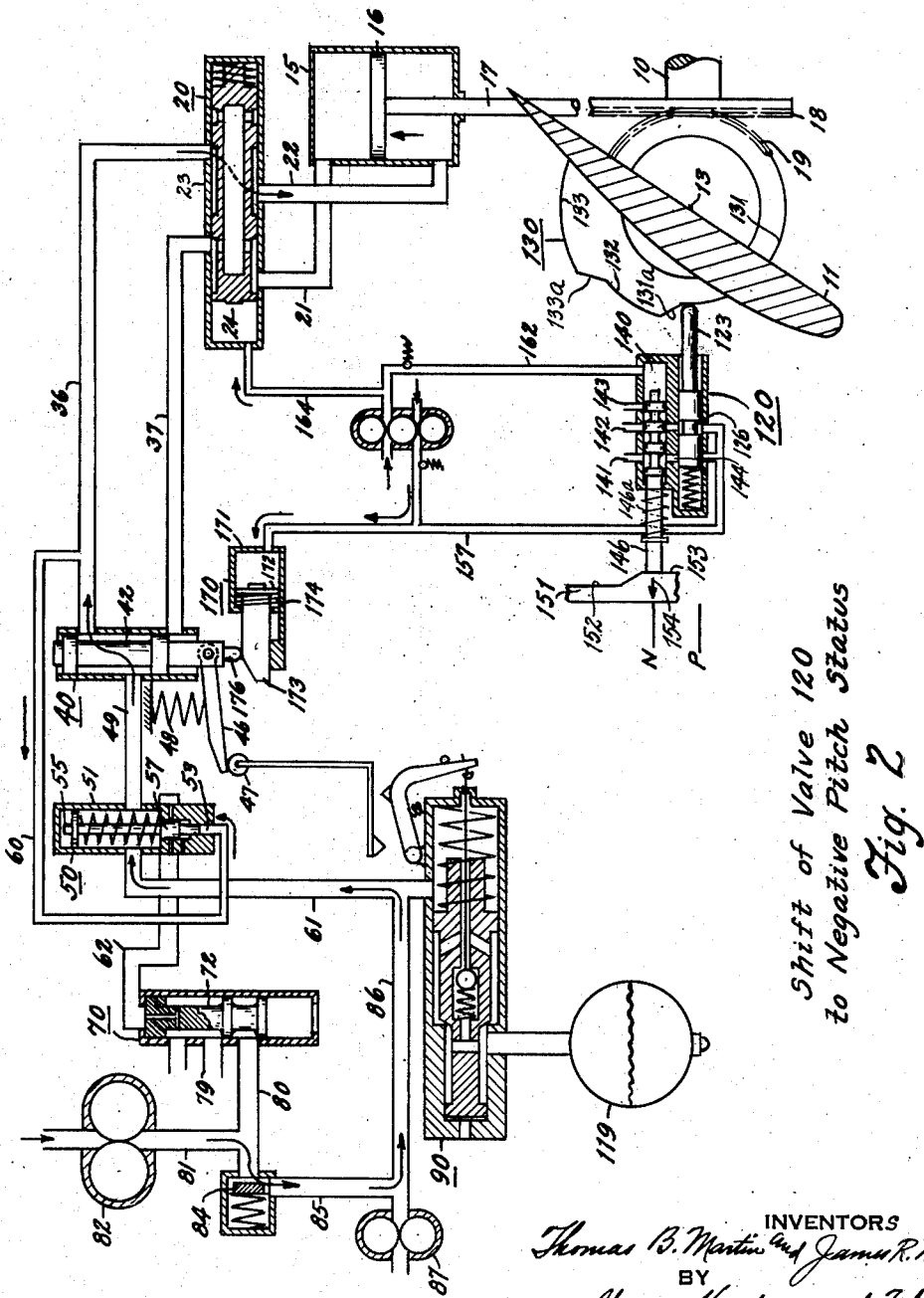

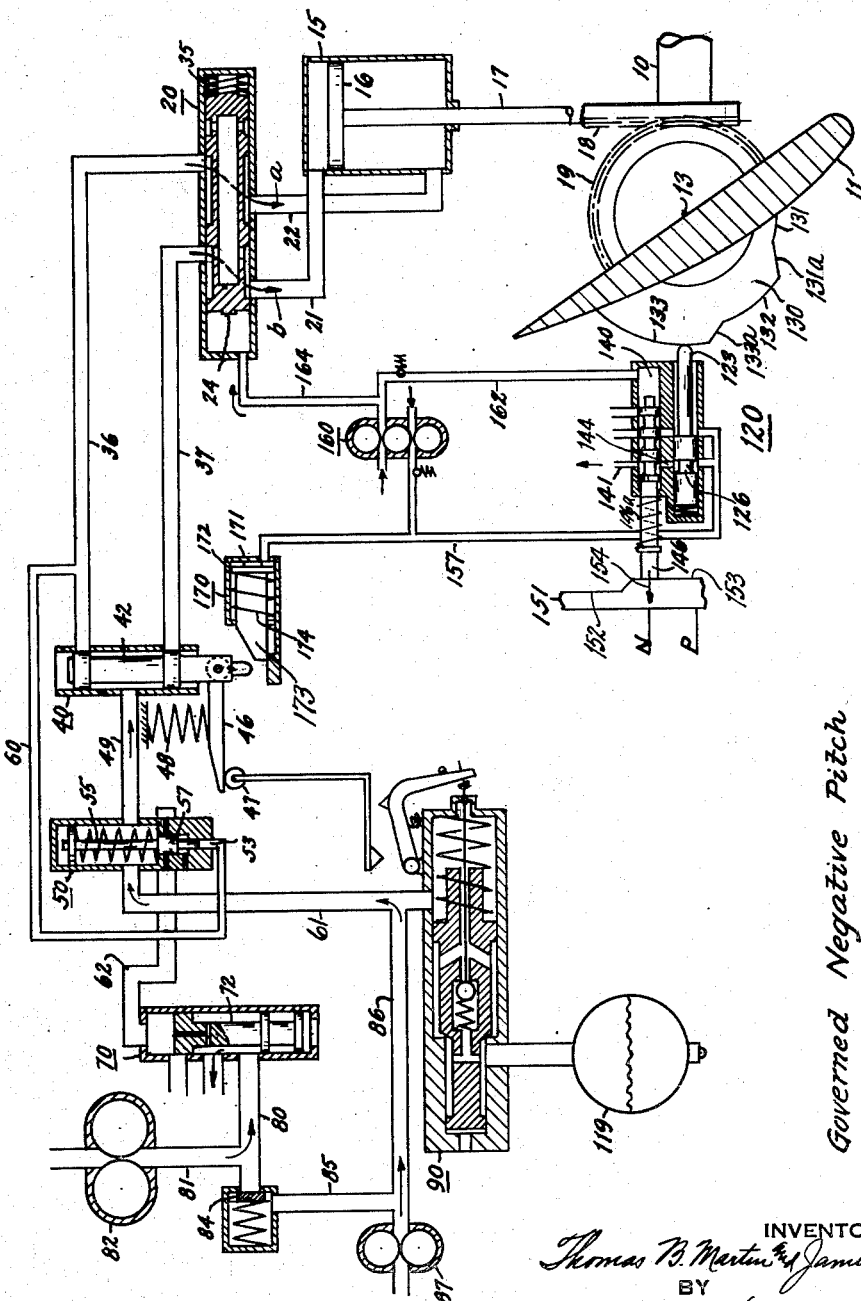

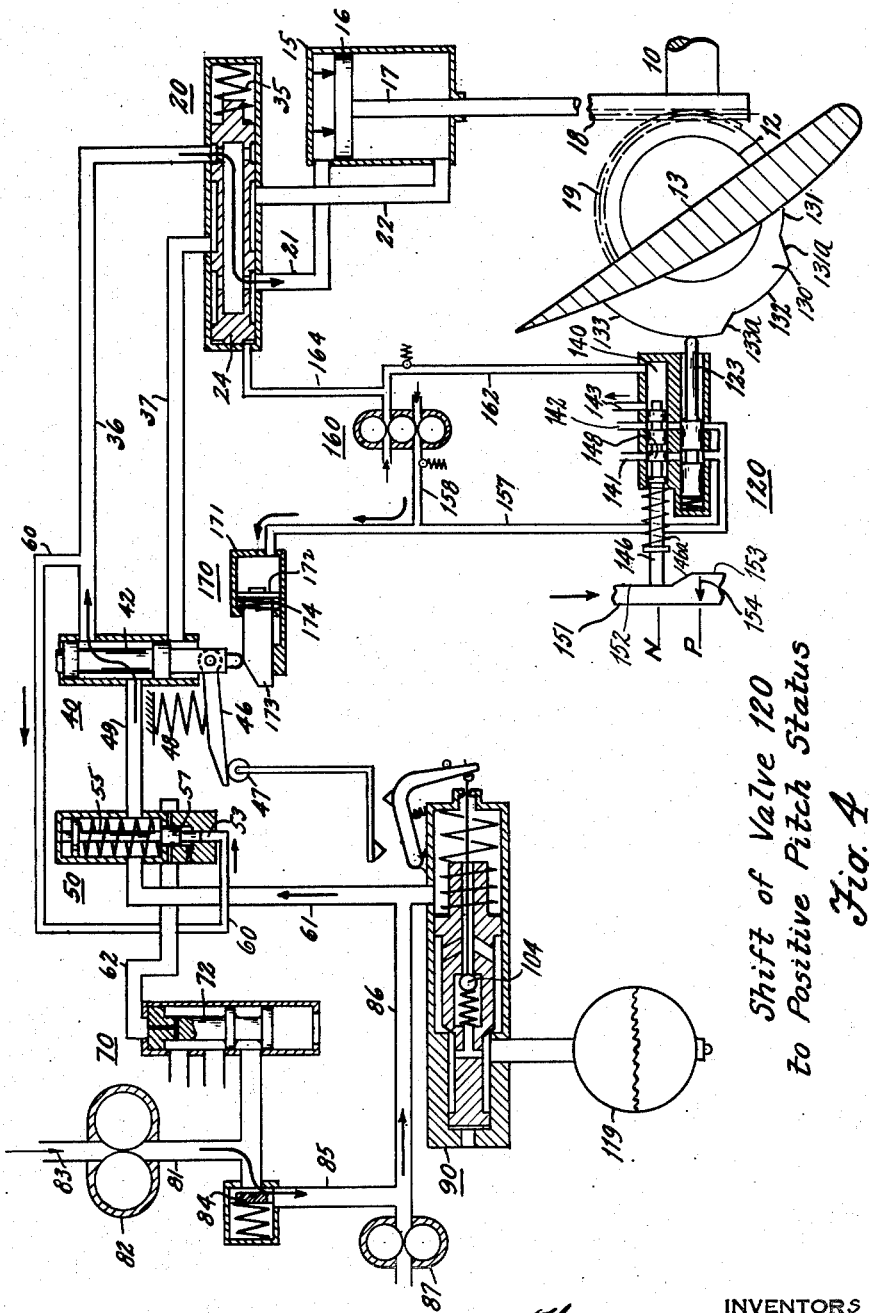

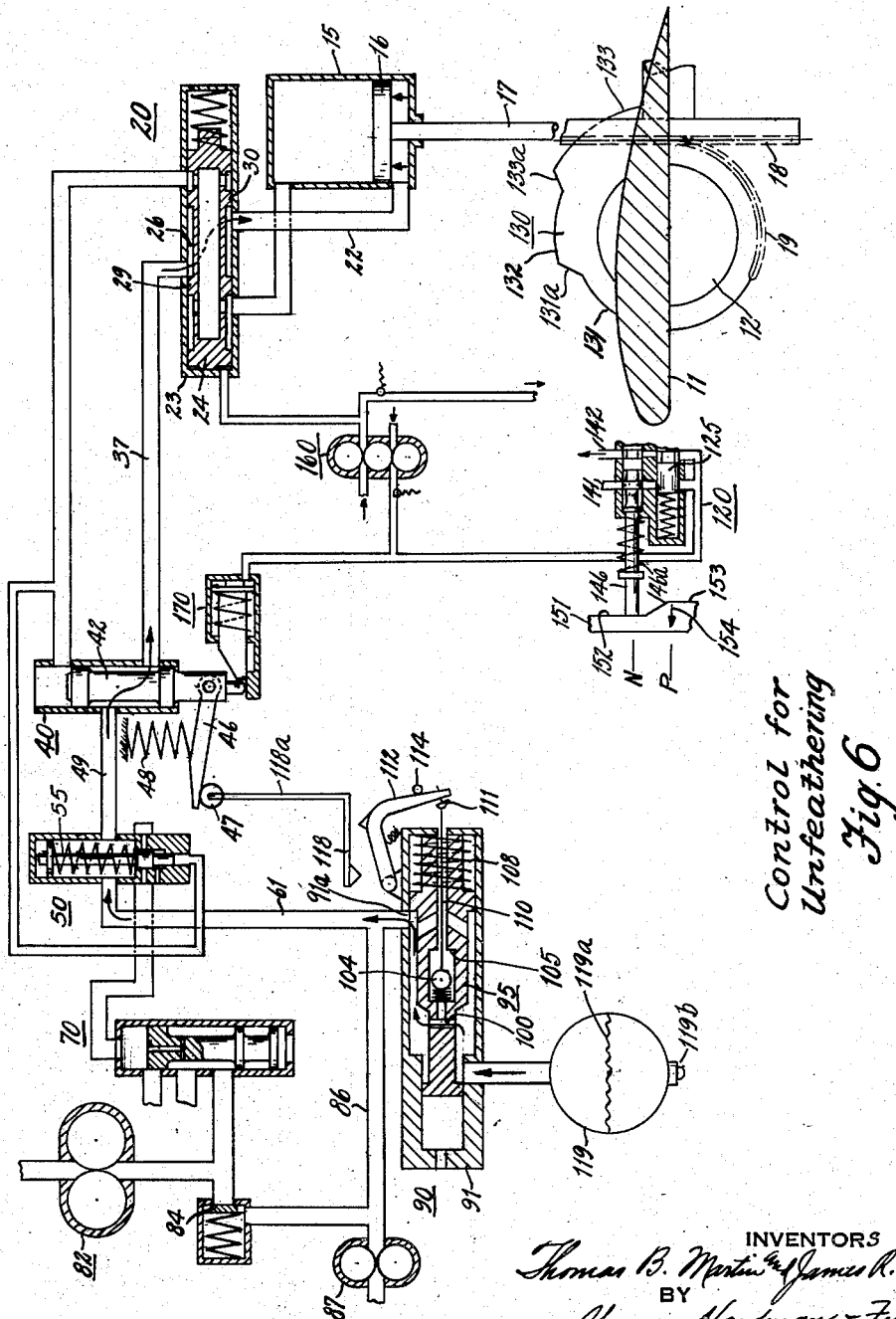

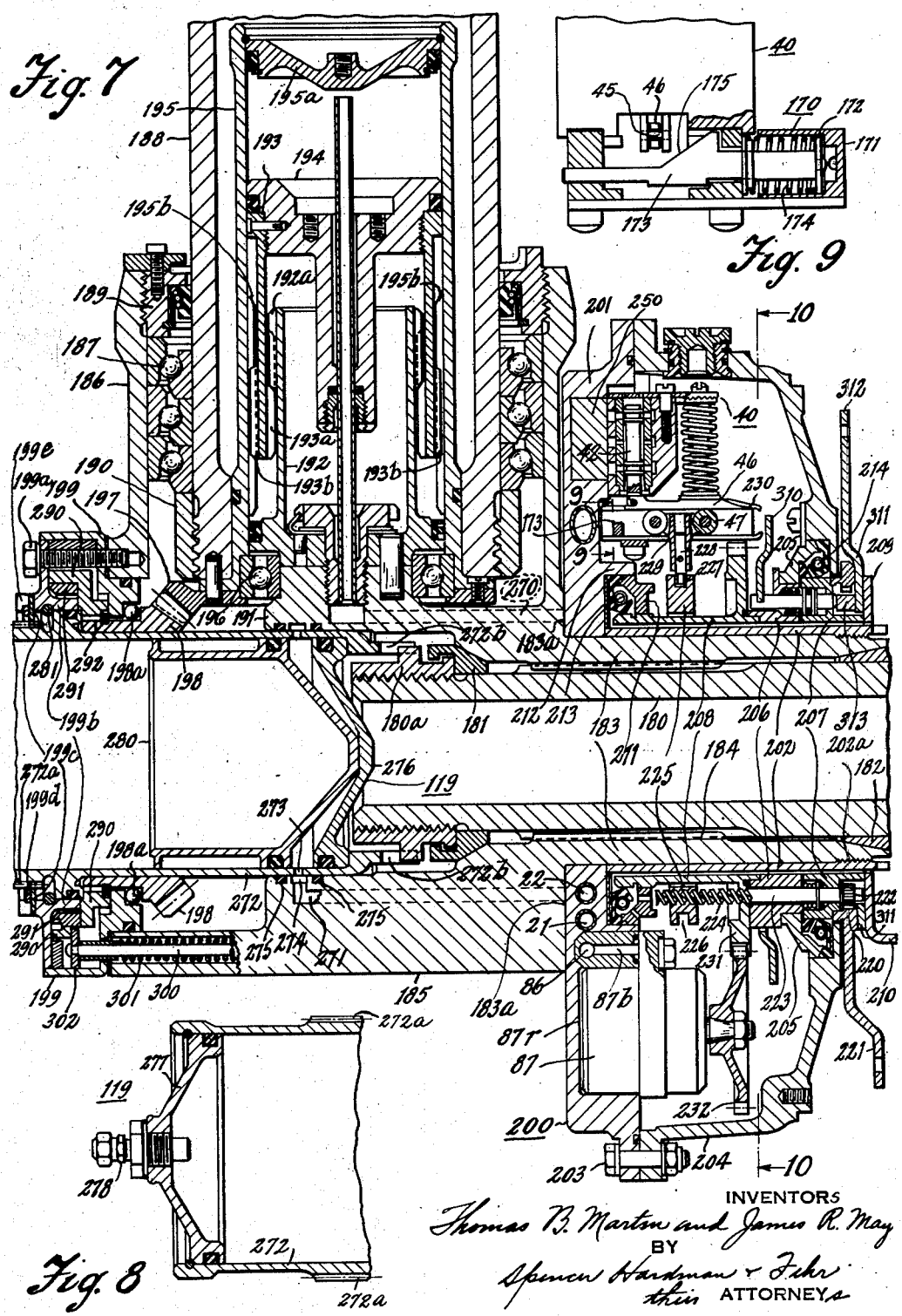

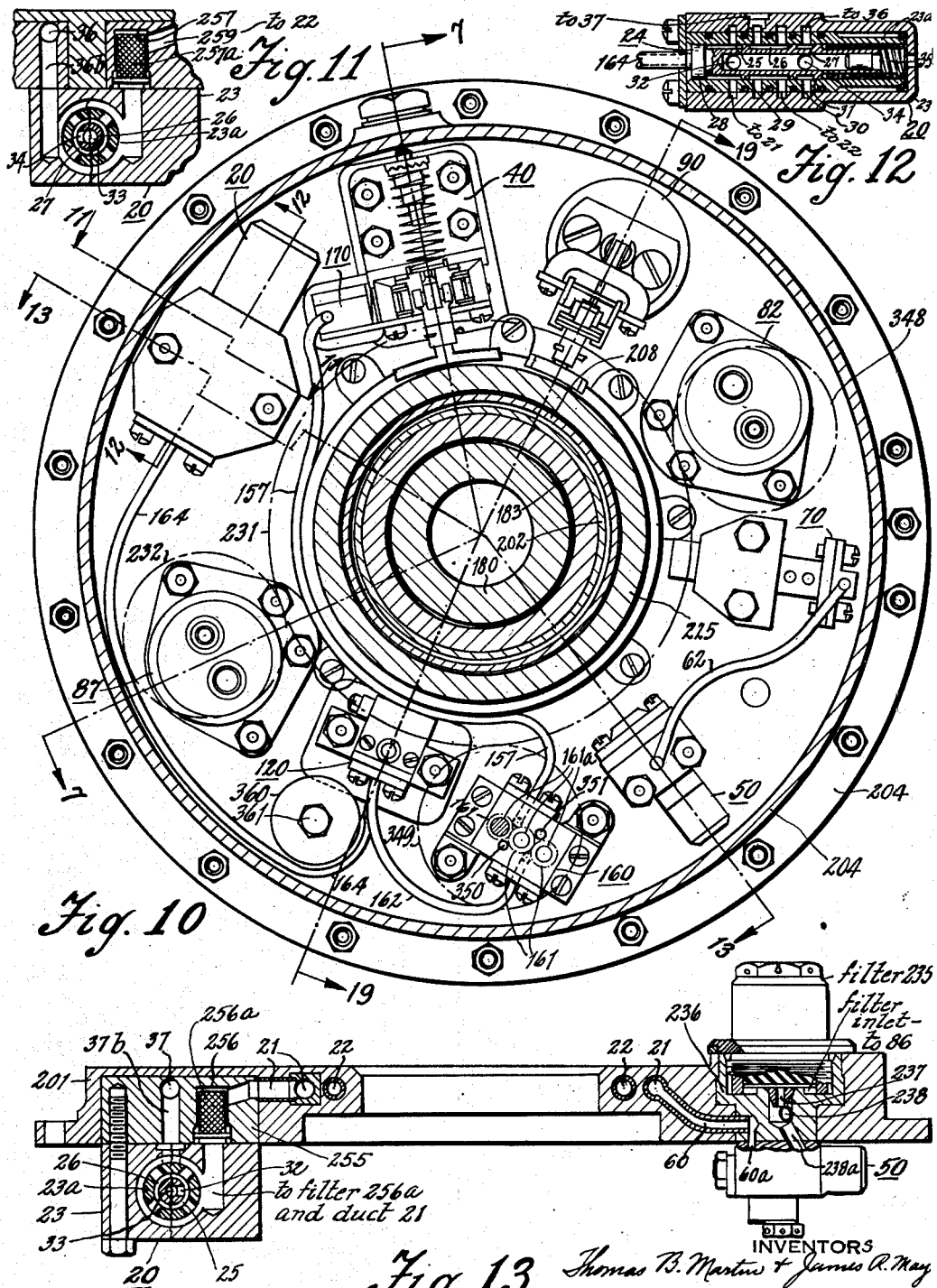

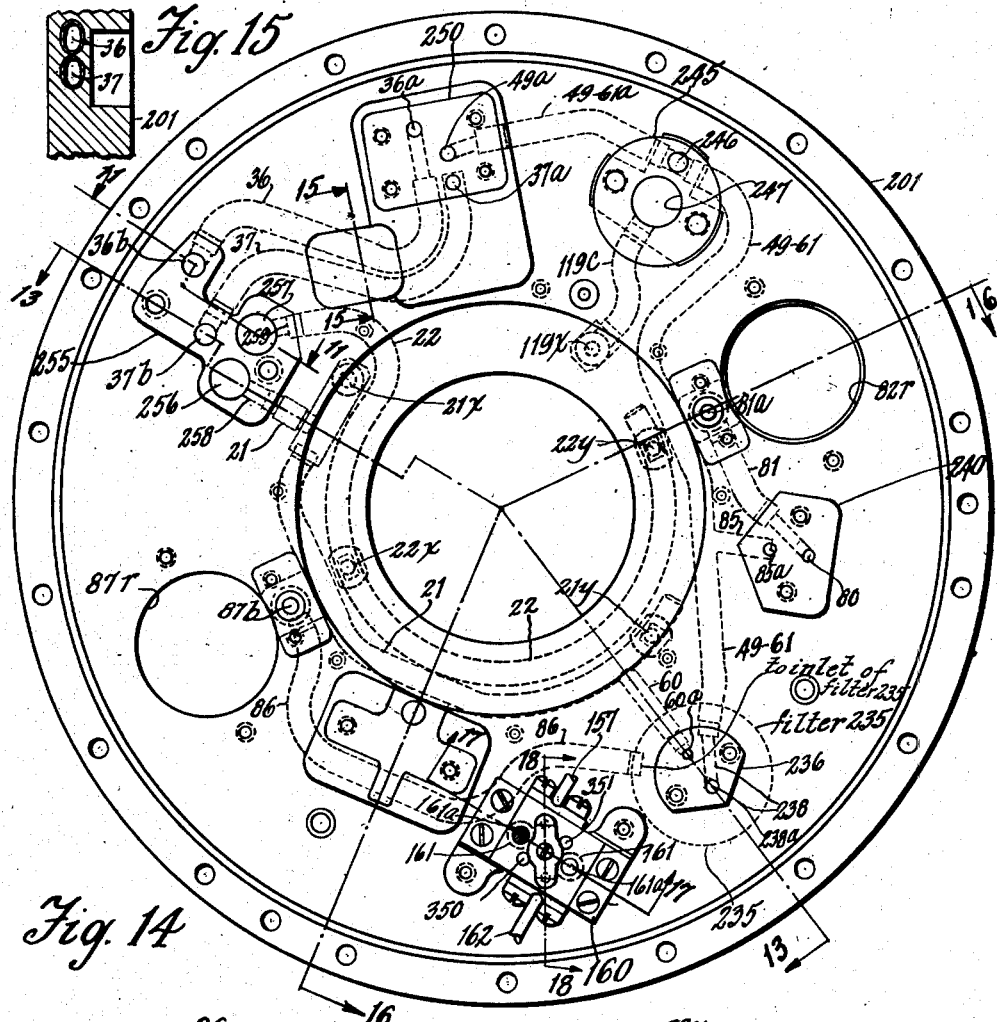
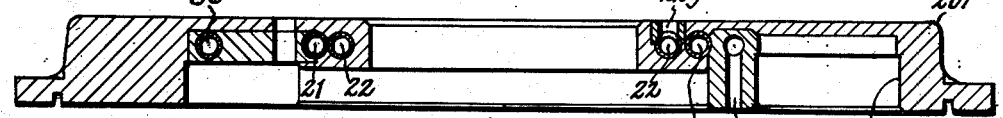
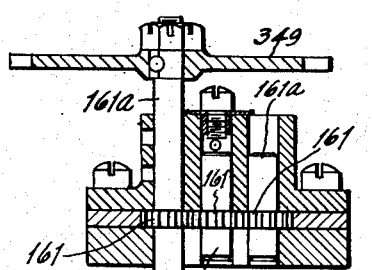
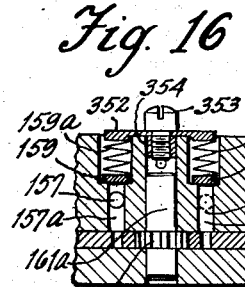

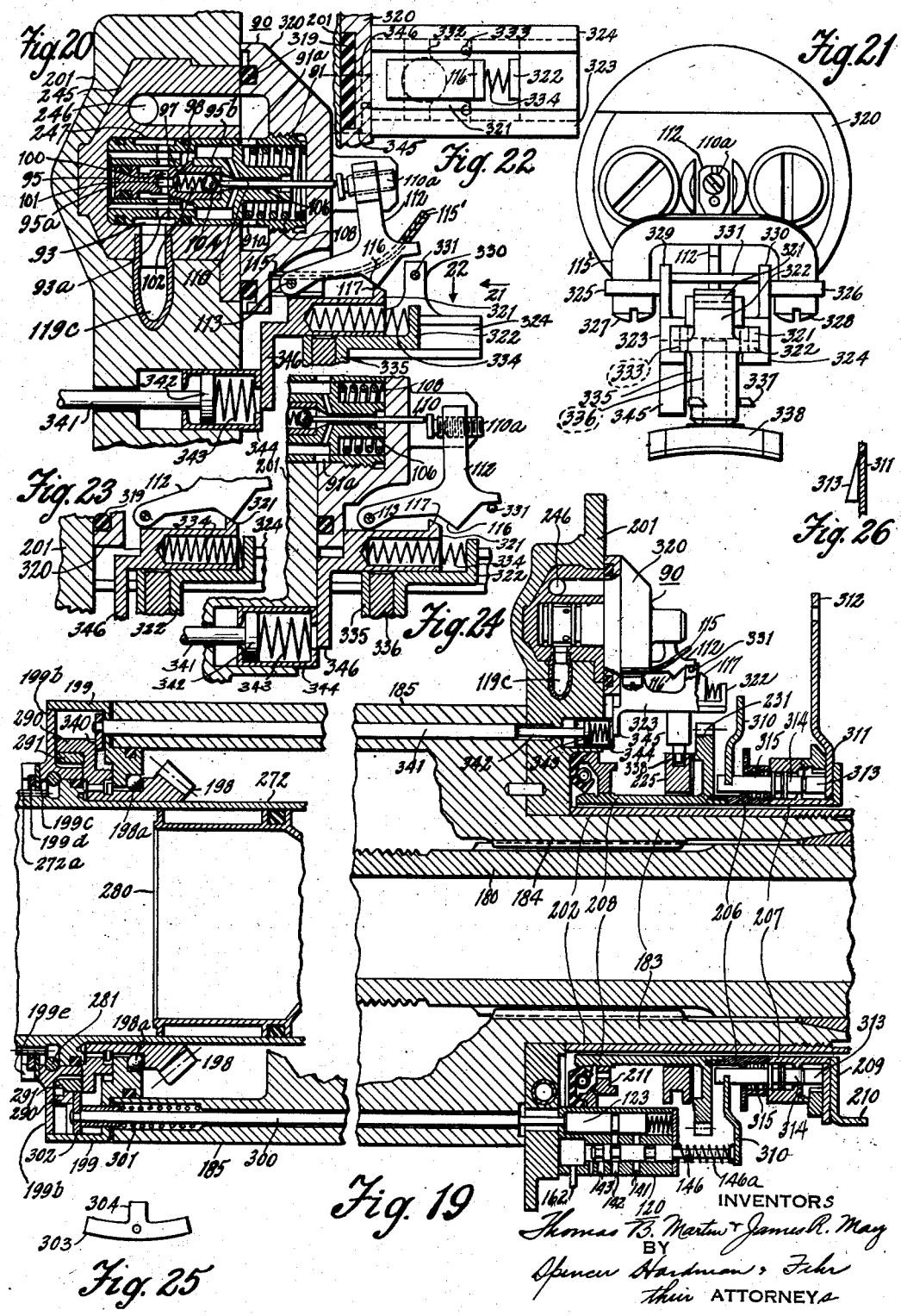

INVENTORS
Thomas B. Martin & James R. May
BY
Spencer Hardman & Fehr
their ATTORNEYS Patented May 11, 1954

2,678,103

UNITED STATES PATENT OFFICE 2,678,103

PROPELLER PITCH CONTROL

Thomas B. Martin and James R. May, Dayton, Ohio, assignors to General Motors Corporation, Detroit, Mich., a corporation of Delaware Application June 27, 1945, Serial No. 601,786

22 Claims. (Cl. 170—160.21)

This invention relates to variable pitch airplane propellers and aims to provide a system of pitch control whereby governed positive pitch, governed negative pitch and feathering may be obtained.

Further objects and advantages of the present invention will be apparent from the following description, reference being had to the accompanying drawings, wherein a preferred embodiment of the present invention is clearly shown.

In the drawings:

Figs. 1 through 6 are diagrams showing the system in different conditions of operation.

Figs. 7 and 8, taken together, constitute a longitudinal, sectional view of the propeller hub which includes the pitch control system shown in Fig. 1. The section through the regulator unit 200 is taken on the line 7—7 of Fig. 10.

Fig. 9 is an enlarged, sectional view on line 9—9 of Fig. 7.

Fig. 10 is a sectional view on line 10—10 of Fig. 7.

Fig. 11 is a sectional view on line 11—11 of Fig. 10.

Fig. 12 is a sectional view on line 12—12 of Fig. 10.

Fig. 13 is a sectional view on line 13—13 of Fig. 10.

Fig. 14 is a plan view of the regulator unit base 201 shown in section in Fig. 7, the various instruments being omitted with the exception of triple gear pump 160.

Fig. 15 is a sectional view on line 15—15 of Fig. 14.

Fig. 16 is a sectional view on line 16—16 of Fig. 14.

Fig. 17 is a sectional view on line 17—17 of the pump 160 of Fig. 14.

Fig. 18 is a sectional view on line 18—18 of Fig. 14.

Figure 27:
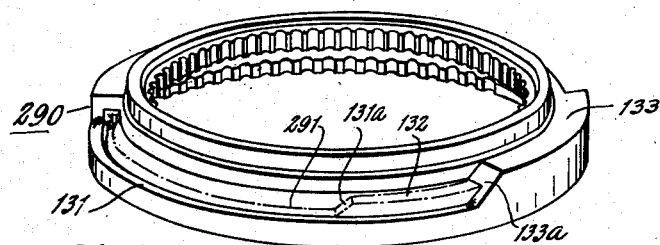

Fig. 19 is a fragmentary, sectional view of that portion of the propeller hub and regulator assembly which shows the control of the feathering valve 90 and the negative pitch control valve 120 and is taken on line 19—19 of Fig. 10.

Fig. 20 is an enlarged sectional view of the feathering control valve 90 and is taken on the line 19—19 of Fig. 10.

Fig. 21 is a view in the direction of arrow 21 of Fig. 20.

Fig. 22 is a fragmentary view in the direction of arrow 22 of Fig. 20.

Figs. 23 and 24 are fragmentary, sectional views showing portions of the feathering control valve in different positions of operation.

Fig. 25 is a side view of cam follower 302 shown in Fig. 19.

Fig. 26 is a side view of cam 313 shown in Fig. 19.

Figure 28:
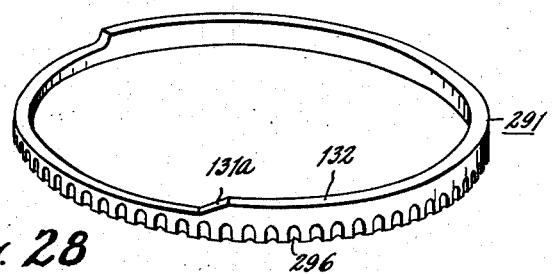

Figs. 27 and 28 are perspective views of the parts of a cam unit used for controlling the feathering valve 90 and the negative pitch valve 120.

Figure 29:
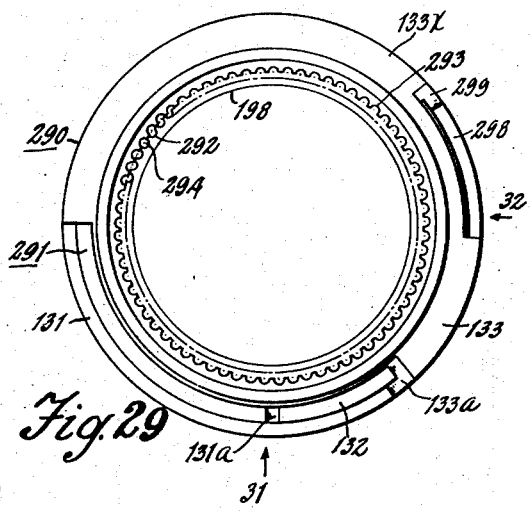

Fig. 29 is a plan view of one side of the cam assembly comprising the parts shown in Figs. 27 and 28.

Figure 30:
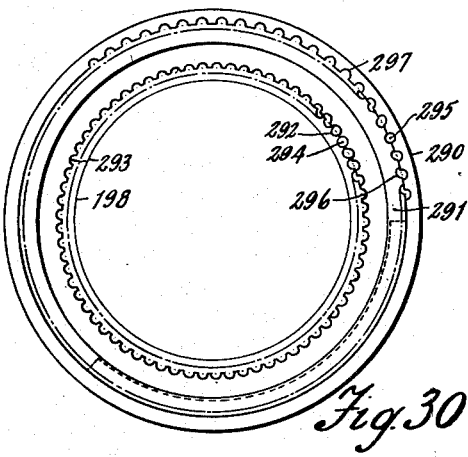

Fig. 30 is a plan view of the reverse side of the assembly.

Figure 31:
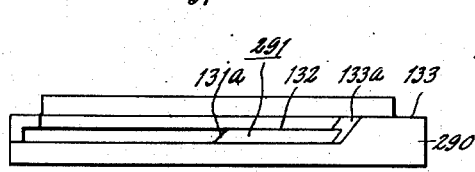
Figure 32:
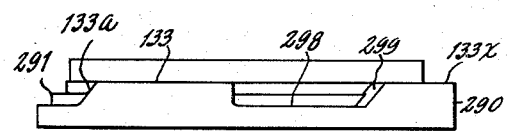

Figs. 31 and 32 are elevational views taken in the direction of arrows 31 and 32 of Fig. 29.

Referring to Fig. 1, the propeller shaft 10 drives a plurality of propeller blades, one of which is shown in section and designated by numeral 11. The root of propeller 11 is represented by circle 12 and the axis of root rotation by numeral 13. The torque unit or means for rotating the blade 11 about the axis 13 comprises a cylinder 15 receiving a piston 16 connected with a rod 17 providing a rack 18 meshing with a gear segment 19 connected with the root 12. It is to be understood that the rack and gear segment for transmitting movement from the piston rod to the blade root are symbolic of other forms of mechanisms for transmitting motion from a servo-piston to the rotatable blade root known to those skilled in the art. The ends of the cylinder 15 are connected by pipes 21 and 22 with a switchover valve unit 20 comprising a cylinder 23 containing a valve 24 having grooves 25, 26 and 27 separating lands 28, 29, 30 and 31. The groove 25 is connected by holes 32 with a central chamber 33 of the valve 24. Holes 34 connect groove 27 with the central chamber 33. A spring 35 urges the valve 24 toward the left. Pipes 36 and 37 connect the unit 20 with the governor unit 40 which comprises a sleeve 41 receiving a valve 42 having lands 43 and 44 and connected by a pin 45 with a lever 46 engaging an adjustable fulcrum 47 against which it is urged by a spring 48. Valve 42 is under joint control by centrifugal force acting in the direction of arrow 42a and by the spring 48 opposing centrifugal force, the effectiveness of spring 48 being determined by the position of the fulcrum 47 which is adjustable horizontally in Fig. 1 from a position near the left end of the lever 46 toward the right. The position of the fulcrum 47 is controlled manually by means to be described later. When the valve 42 is in the equilibrium position causing the torque unit to hold the blade in the adjusted position, the force couple of the spring 48 relative to the fulcrum 47 equals the force couple of the centrifugal force acting upon the valve 42. Since the governed speed of the engine is controlled manually by shifting the fulcrum 47, the governed speed of the engine is manually adjusted.

The governor unit 40 is connected by a pipe 49 with a pressure-control valve unit 50 comprising cylinders 51, 52 and 53. Cylinder 51 receives a notched dashpot plate 54 carried by rod 55 surrounded by a spring 56 which urges the rod 55 upwardly. The rod 55 carries a piston valve 57 slidable in cylinder 52 having a vent 52a. Valve 57 controls ports 58 and 59. The lower end of rod 55 provides the piston in cylinder 53. The cylinder 53 is connected by pipe 60 with pipe 36. The cylinder 51 is connected by pipe 61 with a feathering valve 90 and with a pipe 86. Rod 55 and parts movable therewith are under the action of centrifugal force acting in the direction of arrow 55a.

The ports 58 and 59 are connected by a pipe 62 with a pump-control valve unit 70 comprising a cylinder 71 enclosing a valve 72 having grooves 73 and 74 which separate lands 75, 76 and 77. The cylinder 71 has outlets 78 and 79. The groove 74 is connected with the space above the land 77 by the small internal passages 74a. In response to the action of centrifugal force, valve 72 tends to move upwardly as indicated by arrow 72a.

Cylinder 71 is connected by pipes 80 and 81 with an outlet of an auxiliary high capacity pump 82 having an inlet 83. Valve cylinder 71 is connected by pipe 80, check valve 84 and pipe 85 with a pipe 86 connecting the outlet of a main pressure pump 87 with the pipe 61.

The feathering valve unit 90 comprises a body 91 providing a cylinder 92 of larger diameter and a cylinder 93 of smaller diameter. Cylinder 92 receives the land 94 of a valve 95 having also a land 96 received by the cylinder 93. The shoulder 97 at the junction of the cylinders 92 and 93 provides a valve seat cooperating with a conical valve 98 provided by the valve 95. Between the land 96 and the valve 93 there is a groove 99 connected by a cross passage 100 and a longitudinal passage 101 with a recess 102 which receives a spring 103 urging a check valve ball 104 against a seat 105 thereby normally closing a longitudinal passage 106 which is connected by cross passages 107 with the space between the land 94 and the conical valve 98. A spring 108 urges the valve 95 toward the left. The cylinder 93 is vented at 109. Valve 104 is controlled by a rod 110 passing through a seal 110a and engageable with an adjustable screw 111 threaded into a lever 112 pivotally supported at 113 by the valve body 91 and urged counterclockwise against a stop 114 by a spring 115. When lever 112 is in the position shown in Fig. 1, valve 104 is seated by spring 103. Lever 112 carries a lug 116 engageable with a lug 117 attached to a bar 118 movable horizontally and providing a support 118a for the fulcrum 47. Body 91 is connected by a pipe 119c with an accumulator 119 having a diaphragm 119a separating the upper, hydraulic-fluid receiving space from an air chamber into which is forced air under pressure and retained by a check valve 119b.

The pitch control unit 120 comprises a body 121 having a cylinder 122 for receiving a valve 123 having lands 124 and 125 separated by groove 126 and urged to the right by spring 127 which causes the valve 123 always to engage a cam 130 which is operatively connected with the blade roots 12. The cam 130 has a land 131 for positive governed pitch control, a land 132 for the change between the positive and negative governed pitch control and a land 133 for negative governed pitch control. The valve body 121 has a cylinder 140 having outlets 141, 142, and 143. Valve cylinders 122 and 140 are connected by ports 144 and 145. Cylinder 140 receives a valve 146 having lands 147, 148, 149 and 150. Valve 146 is urged left by a spring 146a so that it may engage a cam bar 151 having a low land 152 and a high land 153. An arrow 154 on the bar 151 points to line P and indicates when the bar 151 is in the positive pitch control position in which the low land 152 is engaged by the valve 146. When, by manual means similar to that used for adjusting the fulcrum 47 of governor unit 40, the bar 151 is moved upwardly in Fig. 1 so that the arrow 154 is opposite line N, the bar 151 is in the position for negative pitch control, in which position the high land 153 is engaged by the valve 146. The body 121 has ports 155, 156 connected by pipes 157 and 158 with one outlet of a fluid pressure pump 160 having three gears 161. Pipe 158 has a relief valve 159. The right end of cylinder 140 of valve unit 120 is connected by pipe 162 with another outlet of the fluid pressure pump 160 connected also by pipe 164 with the left end of the cylinder 23 of valve unit 20. Pipe 162 has a relief valve 163.

Pipe 157 is connected with an increased-pitch lock unit 170 comprising a cylinder 171 receiving a piston 172 connected with a bar 173 surrounded by spring 174 which urges the piston 172 toward the right. The bar 173 has an inclined cam surface 175 for engaging a pin or cam follower 176 provided at the lower end of the governor valve 42.

When propeller speed decreases below the value for which the governor is set, valve 42 moves in toward the propeller shaft and down as in Fig. 1, thereby connecting pipes 49 and 37 and permitting pressure fluid to flow from the pump 87 through the cylinder 23 of valve 20 into the pipe 22 to the lower side of piston 16, thereby causing it to move up and the blade 11 to move counterclockwise in order to decrease the pitch. The load on the engine being decreased, the engine speed increases whereupon the governor valve 42 moves up. If the propeller speed is above the governed speed, the valve 42 moves above the equilibrium position and the pump 87 is connected by pipes 86, 61, 49, 36, the chamber 33 of valve 24 and pipe 21 with the upper side of the piston 16, whereupon the piston 16 moves down in order to increase the pitch and to increase the load on the engine whereby its speed is caused to diminish.

Valve 50 limits the pressure available for pitch change by blowing-off through discharge ports 58 and 59. For pitch decreasing purposes, the pressure is limited to values represented by line A—B (Fig. 1a), said values increasing slightly with speed increase. For pitch increasing purposes, the pressures required in line 36 at various speeds are indicated by line A—C. In order to be sure of obtaining the pressures A—C, means are provided for automatically adjusting the valve 50 to obtain the pressures represented by line A—D, which exceed pressures A—C by a margin which allows for pressure drop in the oil line. This automatic means comprises a piston provided by the lower end of valve rod 55 and the cylinder 53 which receives it and which is connected by pipe 60 with the pipe 36 which is in the pitch-increasing line either for governed positive pitch as has been explained, or for governed negative pitch as will be explained with reference to Fig. 3. Whenever valve 42 rises to connect pipe 49 with pipe 36, the pressure in pipe 36 is communicated by pipe 60 to cylinder 53 to effect an increase in the force which resists downward movement of rod 55 under the action of oil pressure upon the piston 57. Therefore the blow-off pressures of valve 50 rise from values on line A—B to values on line A—D. When the speed error is relatively small, either port 43 or port 44 is slightly opened. The pressure drop at these ports is relatively high; and the pressure in pipe 49 is higher than in pipe 36 or in pipe 37. Valve unit 50 blows off by opening relief ports 58 and 59; and valve 72 of unit 70 is held in by oil-pressure above valve 72. Pump 82 is connected with drain 79. When the speed errors are moderate, pump 87 alone can maintain the flow required for the pitch-charges.

When the speed error is relatively great either port 43 or port 44 will be opened a substantial amount, and the pressure in pipe 49 will fall to such value that piston 57 of unit 50 will block ports 58 and 59, valve 72 will move outwardly by centrifugal force and block drain 79 whereupon pump 82 will discharge through check valve 84 to the line 85—36—61—49. Pump 82 will supply the additional oil flow needed to effect a rapid change of blade angle while the speed error is relatively great. As the speed error diminishes valve 42 closes, pressure in pipe 49 increases, valve 50 blows-off, valve 72 moves in, drain 79 opens, and pump 82 becomes disconnected. The foregoing applies to governed negative pitch as well as to governed positive pitch, as will be apparent from the description of Fig. 3 which is to follow. Other uses of pump 82 while changing from positive to negative pitch and vice versa and while going into feathering are to be described.

During the status of the system for positive governed pitch control, the switch-over unit 20, the pitch control unit 120, the pitch-lock 170 and the feathering valve 90 remain in the condition shown in Fig. 1. The accumulator 119 is connected with the pump 87, or with pumps 87 and 82, by pipes 86, 61, cylinder 92 of unit 90, passage 106, open check valve 104, recess 102, passages 101, 100 and pipe 119c. The check valve 104 closes under the urge of spring 103 to maintain pressure of the fluid in the accumulator that is obtained.

Fig. 2 illustrates the condition of the system after the cam bar 151 has been moved upwardly in order to obtain the shift into negative pitch but before the shift has actually occurred. The upward movement of the bar 151 results in right movement of the valve 146 which blocks the drain 143 of pipe 162 and the drain 142 of pipe 157. Therefore, pressure fluid is delivered by pipe 164 to the left end of switch-over unit 20 to cause it to move right in the position shown in Fig. 2. The blocking of drain pipe 157 causes pressure fluid to enter the cylinder 171 of pitch-lock unit 170, causing the piston 172 to move left and the bar 173 to engage the pin 176 to lift the governor valve 142 to the position shown. The pressure fluid circuit of the pumps 82 and 87 is indicated by the arrows in Fig. 2. More specifically, the circuit includes pipe 81, open check valve 84, pipes 85, 86, 61, pressure control cylinder 51, pipe 49, pipe 36, cylinder 23 of valve 20 and pipe 22 leading to the lower side of the piston 16. Since pipe 36 is in this circuit, pipe 60 conducts pressure fluid to the cylinder 53 of the pressure control valve 50 to urge the valve 57 up, thereby closing ports 58 and 59 and allowing centrifugal force to hold the valve 72 of pump control unit 70 in the upward position, thereby blocking the drain 79 of pump 82. Piston 16 moves up to cause the blade to be shifted from a position of positive pitch shown in Fig. 2 to a position of negative pitch shown in Fig. 3. During this movement, the cam 130 rotates counterclockwise from a position such as shown in Fig. 2 to a position such as shown in Fig. 3. During this movement, the valve 123 is engaged by the rise 131a, the land 132 and the rise 133a. The middle points of rises 131a and 133a determine, respectively, the lower limits of the ranges of positive governed pitch control and negative governed pitch control. That portion of the cam 130 between the middle points of the rises and including the land 132 is a surface of transition between positive and negative governed pitch status. Once the blade has started moving away from the positive governed pitch range, it must move all the way into the negative governed pitch range, and vice versa. There is no governing action while the blade is going through zero pitch.

By the time the blade has arrived in the position shown in Fig. 3 wherein governed negative pitch control is present the valve groove 126 will be in a position for completely uncovering the port 144 so that the pipe 157 is connected with drain 141 and the pitch-lock unit 170 is restored by the spring 174 to normal position whereby the governor valve 42 returns to normal position for controlling negative pitch. The valve 20 has switched connection between the pipes 36 and 37 and the ends of the cylinder 15 so that, when the governor valve 42 moves up, pipe 36 will be connected with the lower end of the cylinder 15 as indicated by arrow a, and when the governor valve moves down, the pipe 37 will be connected with the upper end of cylinder 15 as indicated by arrow b in Fig. 3. The governor 40 will operate to govern the negative pitch just as it is operated to obtain governed positive pitch. The pressure control 50 operates as before to give a higher pressure for increasing negative pitch then for decreasing negative pitch. As in the case of increasing positive pitch, this is necessary because more force is required to increase negative pitch than to decrease negative pitch.

Fig. 4 shows the condition of the system after the control cam 151 has been moved down into the positive-pitch control position but before the change to positive pitch has been made. Valve 123 remains in the negative pitch control position but valve 146 returns to the positive pitch control position under the action of spring 146a and the pressure in cylinder 140. Valve land 148 blocks the connection between pipe 157 and drain 141. Therefore pressure fluid flows from the pump 160 to the cylinder 171 of the lock unit 170, thereby causing the governor valve 42 to be lifted so that its governing action will be withheld during the transition from negative pitch to positive pitch. This movement of valve 146 to the position shown in Fig. 4 causes pipe 162 to be connected with drain 143, thereby relieving the pressure at the left of valve 24 of switch-over unit 20, thereby allowing spring 35 to restore valve 24 to the position shown in Fig. 4. Under these conditions, the upper end of the cylinder 15 is connected with the pumps 82 and 87 as shown by the arrows. The pressure line comprises the pipes 85, 86, 61, 49, 36 and 21. Since pipe 36 is in the line, pipe 60 conducts pressure fluid to the cylinder 53 of the pressure control 50 so that relatively high pressure is available for making a quick shift from negative to positive pitch. When this shift is made, the valve 123 is restored to the position shown in Fig. 1, thereby connecting cylinder 171 of the lock unit 170 with drain 142 whereupon the governor valve 42 is permitted to return to its governing status. Then positive pitch control becomes effective again in the manner explained with reference to Fig. 1.

The control of the lower limits of governed positive and negative pitch control by the cam rises 131a and 133a, respectively, will now be described. Referring to Fig. 1, if during the governed positive pitch status, the land 44 of governor valve 42 were in position for opening the port to pipe 37 to cause counterclockwise rotation of the cam 130 to such extent that the middle point of rise 131a engages the valve 122 of unit 120, this valve will have been moved left to a position which blocks the flow of oil from pipe 157 through 145 and 142 thereby causing pressure oil from pump 160 to move the bar 173 of unit 170 to the left to lift the valve 42 so as to block the flow of oil into pipe 37, whereupon counterclockwise movement of cam 130 ceases. Thus the positive pitch is limited to a value determined by the engagement of the middle point of rise 131a with valve 123. Referring to Fig. 3, if, during governed negative pitch status, the lands 44 of governor valve 42 were in position for opening the port to pipe 37 to cause clockwise rotation of the cam 130 to such extent that the middle point of rise 133a engages the valve 123 of unit 120, this valve will have been moved right to a position which blocks the flow of oil from pipe 157 through either 155 or 156, thereby causing pressure oil from the pump 160 to move the bar 173 of unit 170 to the left to lift the valve 42 so as to block the flow of oil into pipe 37, whereupon counterclockwise movement of cam 130 ceases. Thus the negative pitch is limited to value determined by the engagement of the middle point of rise 133a with valve 123.

Fig. 5 shows the control for feathering but before feathering has actually taken place. The control for feathering is effected by movement of the parts 118, 118a into the extreme right position shown in Fig. 5, thereby placing the fulcrum roller 47 between the spring 48 and the valve 42 and permitting the spring 48 to lift the valve 42 into its upper non-governing position. As indicated by the arrows in Fig. 5, the blade pitch is being increased by the downward movement of piston 16 under the influence of pressure from the pumps 87 and 82 which will supply the needed pressure while the windmilling of the blades is sufficient to operate them for this purpose. When the blades are about at 11' (Fig. 5), windmilling has decreased to the value such that the fluid pressure from the pumps is insufficient to complete feathering. Then pressure from the accumulator is instantly available to complete the feathering. As part 118 is moved into the position shown in Fig. 5 to obtain feathering, lug 117 strikes lug 116 and causes valve 104 to open.

By means not shown in Fig. 5, but which will be described later, valve 104 is held open at least until the blades have moved to position 11' at which the windmilling has diminished to such extent that the use of accumulator pressure is required to complete feathering. While valve 104 is open, pressure oil from the accumulator flows through passages 100, 101 and 107 and into the annular space between the valve seat 97 and the land face 94a, thereby causing the valve 95 to move from the position shown in Fig. 5 toward that shown in Fig. 5A, thereby moving valve portion 98 from its seat 97, thereby connecting the accumulator directly with the space at the left of land 94. While pump pressure exceeds accumulator pressure, land 94 is located to the left of the entrance to pipe 61; but, when pump pressure falls below accumulator pressure, valve 95 moves to the position shown in Fig. 5A, and the accumulator supplies pressure to the pipe 61 and to the upper end of cylinder 15, thereby causing the piston 16 to move down in order to move the blade 11 from the position 11' to the full feathered position shown in Fig. 6. Upon completion of full-feathering flow of pressure fluid from the accumulator ceases, and the pressure differential on valve 95 becomes so far reduced that spring 108 returns valve 95 to the position shown in Fig. 1, where valve 98 is forced against its seat 97 and valve 104 is closed. This retains the pressure-fluid in the accumulator until needed for unfeathering.

Full-feathering of the blades is effected when conditions are such that the engine should be non-operating and hence should not be rotated by the windmilling action of the propeller. When conditions are such that the engine may be operated again, parts 118 and 118a are shifted to the positions shown in Fig. 6 in order that the spring 48 will move the valve 42 down and in order momentarily to open the check valve 104 thereby permitting pressure fluid to flow from the accumulator to the left side of land 94 and thereby causing the valve 95 to move to the position shown in Fig. 6. Then the accumulator is connected with the under side of piston 16 as indicated by the arrows; and the pressure fluid stored therein flows through the valve 90, pipes 61, 49, 37, 22, to the lower end of the cylinder 15 to cause the piston 16 to move up to shift the blade 11 from full-feathered position into such position that the blade can be windmilled to start the engine whereupon governed positive pitch will be resumed. As pressure fluid from the accumulator is discharged, the spring 108 becomes effective to return the valve 95 to the position shown in Fig. 1; and the status of the valve unit 90 returns to normal and charging of the accumulator by the pumps is resumed.

The system of the present invention is part of a propeller hub assembly shown chiefly in Fig. 7. The engine shaft 180 supports conical wedges 181 and 182 between which there is wedged a tubular sleeve 183 splinedly connected with the shaft 180 by the splines 184. The sleeve 183 is clamped between the wedges by tightening a nut 180a threaded on shaft 180. Sleeve 183 is integral with the hub frame 185 having two or more tubular parts 186 extending radially relative to the axis of shaft 180. Each part 186 provides bearings 187 for a blade, the root of which is indicated at 188 (represented by the root 12 of Fig. 1). A nut 189 retains the bearings 187 and a nut 190 retains the propeller root 188. In alignment with each blade root 188, the frame 185 provides a boss 191 to which there is fixed a stationary sleeve 192 having helical splines 192a cooperating with helical splines 193a of a sleeve 193 attached to a piston 194 within a cylinder 195. Sleeve 193 has helical splines 193b cooperating with helical splines 195b of cylinder 195 which is rotatably supported by a ball-bearing 196 carried by the boss 191. The piston 194 corresponds to piston 16 and the cylinder 195 corresponds to cylinder 15 of Fig. 1. Sleeve 192 being stationary, the linear movements of the piston 194 are accompanied by rotary movements thereof due to the splined connections 193a and 192a. Due to splined connections 193b and 195b, the linear and rotary movements of the piston sleeve 193 effect rotation of the cylinder 195 and of the blade root 188. The other blade or blades, not shown, each have a servomotor similar to that shown in Fig. 7. The blades are tied together by a gearing so that they rotate simultaneously and equally. For this purpose, each blade is provided with a gear segment 197 which meshes with a master gear 198 journalled in a ball bearing 198a supported by a frame 199 attached by screws 199a to the hub frame 185.

The sleeve 183 of frame 185 supports the plate 201 (Fig. 7) of a regulator unit 200. Plate 201 is located by a dowel 201a (Fig. 19) in frame 185 and is clamped against frame 185 by a sleeve 202 threadedly connected at 202a with the sleeve 183. When the sleeve 202 is screwed tight, it forces the plate 201 against the surface 183a which is formed at right angles to the axis of the propeller hub. Screws 203 attach to the plate 201 a housing 204 which supports a ring 205 which is journalled on a non-rotatable annular frame 206 intermediate annular frames 207 and 208 which are all secured together and thus provide the fixed part of the regulator housing. In order to fix these parts against rotation, there is secured to the part 207 a plate 209 having a tang 210 which fits in a notch (not shown) provided by the engine frame. The part 208 provides a journal for a ring 211 fixed within a tubular boss 212 provided by the regulator plate 201. A shaft seal 213 is located in the recess provided by the plate 201 and the ring 211 and engages the sleeve 208 in order to prevent the leakage of oil from the annular chamber provided by the regulator unit. Likewise a seal 214 at the right end of the unit, serves the same purpose.

The stationary annular members or sleeves 206, 207 and 208 support certain manually operated control devices. One of these devices is means for varying the governed speed of the propeller. It comprises a ring or internal gear 220 rotatably supported by the part 207 and rotated by a lever 221. The gear 220 meshes with a plurality of (preferably three) pinions 222 which operate shafts 223 journalled in the part 206. Each shaft 223 provides a screw 224 threaded through a grooved ring 225 whose groove 226 receives a shoe 227 located on a pin 228 attached to a carriage 229 guided by ways 230 provided by the governor which is attached to the plate 201. The carriage 229 supports the fulcrum roller 47 as is shown in Fig. 1. Movement of the lever 221, for the purpose of changing the governed speed, is transmitted through the rotating shafts 223 and screws 224 to cause axial movement of the ring 225 in order to change the position of the fulcrum 47.

The stationary part 208 provides a gear 231 which meshes with a plurality of smaller gears, one of which is shown at 232 in Fig. 7. The gear 232 drives the main pump 87 which is of the well known gear type and is secured within a recess 87r provided in the plate 201 for this purpose. The pump outlet is connected with a passage 87b which leads to pipe line 86 which is embedded in the plate 201. In fact practically all of the ducts shown in Fig. 1 are contained within the plate 201 except the few that are external thereto as shown in Fig. 10. The various ducts which are enclosed within the plate 201 are shown in Fig. 14 and bear reference numerals corresponding to the parts shown in Fig. 1.

As shown in Fig. 9, the lock-out unit 170 (Fig. 1) is secured to the frame of the governor 40. The pipe 157 which connects it with the pitch control valve 120 is shown in Fig. 10. The pipes 164 and 162 which connect the pump 160 with the switch-over valve 20 and with pitch control valve 120 are not connected exactly as shown in Fig. 1; but they are connected by the frame 121 of the valve 120 as shown in Fig. 10. The external pipe 62 connects the pump control valve 70 with the pressure control valve 50.

As previously stated with reference to Fig. 1, the outlet of pump 87 is connected with pipe 86 which, as shown in Fig. 14, leads to a filter 235 represented by the dotted circle in Fig. 14 and actually shown in Fig. 13. The filter is screwed into an insert 236 forming a pad for receiving the pressure control valve 50. The outlet 237 of the filter is connected with a duct 238 which is connected through duct 238a with the cylinder 51 of regulator 50 and which is also connected with a duct marked 49—61 in Fig. 14 (since this duct performs the function of the pipes 49 and 61 in Fig. 1). The construction amounts to placing a filter between pipes 86 and 61 in Fig. 1. Hole 60a in pad 236 is a continuation of pipe 60 which is connected with pipe 21 which is connected with the pitch-increasing side of governor 40.

Numeral 240 indicates a pad insert in the plate 201 for receiving the pump control valve 70 (see Fig. 10). Pad 240 provides a hole 85a connected with pipe 85 which branches from duct 49—61. Since pipe 86 is connected through the filter 235 with duct 49—61, this amounts to connecting the pipe 85 directly with the pipe 86 as shown in Fig. 1. The hole 85a is connected with the check valve 84 shown diagrammatically in Fig. 1 and built into the valve unit 70. The pad 240 provides the duct 80 which is connected with the duct 81 connected with a hole 81a with which the outlet of the pump 82 (Fig. 1) is connected, when this pump is secured to the plate 201. The hole 80 leads to the cylinder 71 of the valve 70 and is connected through the check valve 84 with the pipe 85.

Plate 201 provides a pad 245 for receiving the feather control valve unit 90 (Fig. 10). Pad 245 provides a hole 246 making connection with duct 49—61 and a continuation thereof 49—61a. The hole 246 provides a connection between the pipe 61 and the valve cylinder 91 shown in Fig. 1. Pad 245 provides a recess which is connected by the pipe 119c a port 119x and a passage 271 (Fig. 7) with the accumulator 119.

The plate 201 provides a pad 250 for receiving the governor 40. It has holes 36a, 37a and 49a connected respectively with the pipes 36, 37 and 49—61a.

The plate 201 provides a pad 255 to which the switchover valve 20 is attached. The pad passages 36b and 37b connected respectively with pipes 36 and 37 for making connections with the cylinder 23 of valve 20 (Fig. 1). The connections between the cylinder 23 and pipes 21 and 22 include filters. For this purpose, the pad provides recesses 256 and 257 for receiving filters 256a, 277a (Figs. 11 and 13) connected by ducts 258 and 259 respectively with the pipes 21 and 22. This amounts to placing filters in the connections between pipes 21 and 22 (Fig. 1) and the cylinder 23.

The pipe 21 has branch ports 21x and 21y and the pipe 22 has branch ports 22x and 22y. The assembling of the plate 201 with the frame 185 causes each of these branch ports to become connected with a passage, such as 270 (Fig. 7), leading to a torque unit. In like manner, the port 119x of pipe 119c becomes connected with passage 271 (Fig. 7) leading to the accumulator 119.

The accumulator 119, as shown in Figs. 7 and 8, comprises a cylinder 272 having an inlet 273 located in alignment with an annular groove 274 connected with the passage 271. The groove 274 is located between seals 275. Cylinder 272 has an inner end member 276 and an outer end member 277 into which a check valve 278 is threaded. Valve 278 resembles a tire valve and serves to retain air under pressure forced into the cylinder 272 and causing a diaphragm piston 280 to be forced toward the inner wall 276 as shown in Fig. 7. The cylinder 272 is retained by a snap ring 281 received by a groove in a ring 199b secured by the screws 199a to the frame 185.

The parts 199 and 199b provide a housing for a cam unit (Figs. 27 to 32) comprising parts 290 and 291 which are assembled as shown in Figs. 29 and 30 in order to provide the cam lands 131, 132 and 133 indicated in Fig. 1. These parts are made separate so that an adjustment can be made between the rise 131a and the rise 133a in order to adapt the mechanism for various engine and propeller blade combination. The outer member 290 is secured to the gear 198 in various positions of angular adjustment by providing the hub of the gear 198 with an external, circular row of semi-cylindrical notches 292 (Fig. 29) and the outer member 290 with an internal, circular row of semi-cylindrical notches 293 of the same size. The annular spacing of these rows of notches is slightly different. When the parts are adjusted at the proper angular relation, a peg 294 is driven into those notches which are in radial alignment. In a similar manner the member 291 is attached to the member 290 in various positions of angular adjustment. A peg 295 is received by that notch 296 of part 291 which is in radial alignment with the notch 297 of part 290 when the parts 290 and 291 have been relatively adjusted to the desired angular relation. In order to provide a control for the feathering valve 90 as will be explained later, the cam member 290 is provided with a recess or notch which defines a land 298 joined by a rise 299 with land 133x which is flush with land 133.

The valve 123 of Fig. 1, is not directly engaged by the cam lands 131, 132 and 133 as shown in Fig. 1 but indirectly by a push rod 300 (Fig. 19). The push rod 300 is supported by the frame 185 and is urged toward the left by a spring 301 which forces a cam follower 302 attached to the rod 300 against the cam. As shown in side view in Fig. 25, follower 302 provides an arcuate surface 303 fitting the inner surface of the part 199, thereby preventing turning of the follower. The tang 304 of the follower is the part which engages the cam 290. As the blade root 188 (Fig. 7) is rotated, the cam members 290 and 291 are caused to rotate in order to control the valve 123 in the manner which has been explained with reference to Fig. 1.

The valve 146 of the pitch control valve unit 120 is maintained by a spring 146a in contact with a plate 310 which is manually shifted axially of the engine shaft by means which corresponds to the function of the part 151 of Fig. 1. The means for shifting the plate 310 comprises a ring 311 rotatably supported by the part 207 and having a manually operated lever 312 and carrying three equally spaced cams 313 shaped as shown in Fig. 26. Each cam 313 controls the movements of the rod or cam follower 314 supported by the parts 206 and 207 and connected with the plate 310. Each rod 314 is urged toward the cam 313 by a spring 315.

As shown in Fig. 20, the piston 95 of the feather valve unit 90 comprises parts 95a and 95b. The cylinder 91 is received by recess 247 in pad 245 of Fig. 14. The passage 246 in this pad is connected with the interior of the cylinder 91 by holes 91a which are enclosed by a frame 320 secured to the pad 245 and sealed by ring 319. The accumulator is connected with the pump line 49—61 by the passages 91a and passage 106 through which the valve rod 110 extends, the recess around opened check valve 104, passages 102, 101 and 100, and cross passage 93a leading to groove 93 which is connected by duct 119c with the accumulator. Flow of oil under pressure from the accumulator is prevented by the closing of the check valve 104 when the pressure in the accumulator exceeds the pump pressure. The valve 104 is opened by counterclockwise movement of the lever 112 which is biased in a clockwise direction by a leaf spring 115' corresponding to spring 115 in Fig. 1. The lug 117 of Fig. 1 which operates upon the lug 116 of lever 112 is carried by a part 321 corresponding to the part 118 of Fig. 1. The part 321 is supported by part 322; and both parts 321, 322 are guided for horizontal movement (Fig. 20) by ways 323 and 324 (Fig. 21) having flanges 325 and 326, respectively, attached by screws 327 and 328, respectively, to the frame 320. The ways have ears 329 and 330, respectively, carrying a cross pin 331 which serves as a stop for limiting clockwise movement of lever 112 as shown in Figs. 19 and 24. The part 321 has notches 332 for receiving a pin 333 fixed to the part 322 as indicated in Figs. 21 and 22. A spring 334 located between the parts 321 and 322 (Fig. 20) urges them apart; and the separation is limited by the engagement of pins 333 with the right ends of the notches 332 as shown in Fig. 22. The part 321 therefore moves with the part 322 unless prevented by doing so by means to be described. The part 321 has a tubular extension 335 which receives a rod 336 retained by a cotter pin 337 passing through it. The lower end of the rod carries a shoe 338 received by the groove 226 in the ring 225 which is manually adjusted as described for the purpose of shifting the fulcrum members 47. Since this control ring 225 concurrently adjusts the fulcrum 47 and by the part 322 which moves the lug 117, the member 118a of Fig. 1 has been used to represent the common controlling element for both of these members; but, actually, each of these members has its own connection by a shoe with the control ring 225.

When it is desired to stop the engine while in flight full feathering of the blades is required in order to prevent operation of the engine by the wind-milling of its propeller. As stated with respect to Fig. 5, the fulcrum 47 of the governor 40 and the lug 117 controlling feathering valve 90 are moved into feathering control position. The engine is rendered non-operative. During a portion of movements of the blades from the position shown in Fig. 5 to that shown in Fig. 6, the engine is wind-milled at high speed and the pressure of the torque unit operating pumps is substantially higher than normal. It is advantageous to keep the check valve 104 open during the high wind-milling period in order that the accumulator may be charged at the abnormal pressure. Extra pressure in the accumulator is needed to complete feathering after wind-milling and pump pressure has substantially diminished, because the pressure required to increase blade pitch to full feather is higher than normal especially when the air speed is high. The check valve 104 is positively held open at least until the time that pump pressure falls below accumulator pressure, so that the accumulator pressure is instantly available to effect full-feathering. Then the check valve 104 closes in order to retain the remaining accumulator pressure required to move the blades out of feathering. This control of check valve 104 will now be explained with reference to Figs. 19–24.

During the normal range of positive governed pitch the cam 290 holds a cam follower 340 in the position shown in Fig. 19. The follower 340 is attached to a rod 341 (guided by frame 185) which holds a plunger piston 342 in such position as to cause a spring 343 to urge a plunger cylinder 344 against a lug or tail 345 extending from the way 323 shown in Fig. 19. When the control ring 225 is moved into the position to demand feathering whereby the fulcrum 47 is located as shown in Fig. 5, the shoe 338 is also moved toward the left from the position shown in Fig. 19. During a portion of this movement the parts 321 and 322 move together and the lug 117 moves against the lever 112 to cause it to move counterclockwise as the lug 117 rides along the lug 116 into the position shown in Fig. 20. When lever 112 arrives at the position shown in Fig. 20, a lug or tail 346 depending from the part 231 strikes the plunger 344, and movement of the part 321 is arrested since the spring 343 is stiffer than the spring 334. While the lever 112 is held in the position shown in Fig. 20, the ball check valve 104 is held open; and it will remain open although the part 322 is moved further to the left by the control ring 225. Fig. 23 shows part 321 in the same position as shown in Fig. 20, whereas part 322 has been moved further toward the left thereby compressing the spring 334 beyond its normal state of compression. This means that, although the control ring 225 has been manually actuated so as to obtain full feathering, the ball check valve remains in the position shown in Fig. 20 while the cam 290 is approaching a position corresponding to which the blade angle relative to full feathered position is relatively low (for example about 30°). Before that angle is reached, the wind-milling action has decreased to such extent that pump pressure is below accumulator pressure. The check valve 104 being still open, valve 95 is caused to move by accumulator pressure to the position shown in Fig. 24 and the accumulator is connected with the servo-unit 15 to complete the feathering. When the cam 290 has arrived at a position corresponding to a blade angle of 30° from full-feathering, the cam land 298 has moved into alignment with the follower 340. The rod 341 and plunger 344 move left to permit part 321 to move by the action of spring 334 into the positions shown in Fig. 24, and lever 112 returns to normal position so as not to obstruct movement of the check valve 104 to closed position when full-feathering has been completed. When full-feathering has been effected, the flow through ports 91a ceases and spring 103 restores the valve member 95 to normal condition preparatory to return from full-feathering to positive governed pitch as explained with reference to Fig. 6. The right movement of part 321 from the position shown in Fig. 24 to that shown in Fig. 19, effects, through lug 117 striking lug 116 of lever 112, a momentary opening of check valve 104 which is sufficient to cause valve 95 to move by accumulator pressure to the position shown in Fig. 6; and the accumulator is connected with the torque-unit for the unfeathering function.

The disclosure of the switch-over valve unit in Figs. 10 through 13 is substantially the same as in Fig. 1 with the exception that there is a liner 23a within the cylinder block 23. Fig. 11 shows that there is a filter 257a between the valve 20 and the outlet 259 to duct 22. Fig. 13 shows that there is a filter 256a between the valve 20 and the duct 21.

Fig. 10 shows that the pump 82 is mounted upon plate 201 about diametrically opposite pump 87. Pump 82 is mounted in the same manner as the pump 87 and is located in a recess 82r, Figs. 14 and 16. It is driven by a gear 348 which meshes a gear 231.

Gear 231 drives gear 349 attached to one of the three pump shafts 161a of pump 160. The shafts 161a are attached to the meshing pump gears 161. The pump inlets 350 and 351 are shown in Figs. 10 and 14 and the outlets leading respectively to pipes 157 and 162 are indicated at 157a and 162a in Fig. 18 which shows the check valves 159 and 163 as part of the pump structure. The springs 159a and 163a, which respectively urge the check valves toward their seats, are retained by a bearing 352 secured by screw 353 to a plug 354 forced into the bore for the middle shaft 161a.

Fig. 10 shows the use of one or more counterweights 360 secured by screws 361 to plate 201 for the purpose of obtaining a balance of the rotating structure.

The accumulator body 272 is used as a wrench for tightening and loosening the nut 180a, Fig. 7. For this purpose the body 272 is provided with notches 272b for receiving lugs extending from the nut 180a. The body 272 is provided with serrations 272a which extend exterior to the hub assembly and to which a wrench may be applied in order to force the cones 181 against the propeller hub 183 or to retract the same. When the accumulator body 272 has been tightened, it is prevented from turning by placing over the serrations a disc 199c having internal serrations which match the serrations or splines 272a of the body 272. The disc 199c has tangs which are received by notches 199e in the ring 199b. The disc 199c is retained by a snap ring 199d. The ring 199b forms a cover for the chamber 199 and is secured by the screws 199a which secure both the cover 199 and the ring 199b to the hub 195.

*Résumé*

In making the change from the positive to the negative range of pitch control and vice-versa, it is apparent that the mode of operation is to reverse the connections between the governor ports and the torque-unit cylinder and to hold the governor valve in such position that one of the governor ports is held open until after the shift from one range into the other has been made. In shifting from the positive pitch range to the negative pitch range, the pitch is decreased to zero and is then increased in the negative sense. The governor port which is held open during the shift is the one which, during positive pitch control, is the pitch-increasing port. That port becomes, due to the reversal of connections between the governor and the cylinder, the positive-pitch-decreasing port and then the negative pitch increasing port. Conversely, during the shift from the negative pitch range to the positive pitch range, that same port is held open because, due to reverse of connections again, it becomes the negative pitch-decreasing port and the positive pitch-increasing port. The shift from one range to the other is always completed before the governor valve is released for normal operation.

The switch-over valve 20 which controls the reversal of connections between the governor ports and the torque unit cylinder and the governor valve retainer or lock-out 170 are controlled by the unit 120 which has a manually operated valve which effects concurrently the reversal of connections by the valve 20 and the functioning of the lock-out 170, and which has a valve 123 controlled automatically by cam 130 in response to shift of the blades from one pitch range to the other for disabling the lock-out. For this purpose the cam 130 provides a low land 131 and a high land 133. Instead of a continuous rise between the lands 131 and 133, an intermediate land 132 and two short rises 131a and 133a are provided. The land 132 merely spaces the rises 131a and 133a which so control the valve 123 as to place minimum limits on positive and negative pitch, respectively. Therefore the unit 120 functions to effect the shift between positive and negative pitch and to provide the minimum limits of positive and negative pitch control.

The pump 87 provides the oil flow required for pitch-change to correct small speed errors. Oil flow under pressure from the pump 82 is demanded only when necessary to maintain the flow rate required to initiate the correction of a relatively large speed error or to effect a rapid change from positive to negative pitch, or vice versa, or to effect feathering up to the instant that pump pressure falls below accumulator pressure. Normally, pump 87 is idle most of the time, and very little power is required for its idle operation. Valve 70 which controls the opening and closing of drain 79 of pump 87 operates as an hydraulic relay under control by the pressure control valve 50. So long as the oil line pressure tends to exceed the pressure limits set by the valve 50 at various speeds, the valve 50 blows-off and causes valve 70 to connect pump 87 with drain 79. When oil line pressure falls below the limits set by valve 50 at various speeds, the valve 50 ceases to blow-off and valve 70 effects the closing of the drain 79 of pump 87. Valve 50 senses the difference between required pressure and pressure actually supplied to the line by pump 87, and effects the flow of oil from pump 82 into the pressure line when the actual pressure falls below the required pressure and causes the pump 82 to become idle when actual pressure equals or exceeds required pressure.

In order to minimize heating of the oil, valve 50 is set by a properly calibrated spring 56 to blow-off at the pressures required for pitch-decrease at various speeds. Only when pitch-increasing is demanded, the blow-off pressures are increased automatically. The blow-off pressure increase is effected in response to pressure in line 36 which is communicated through pipe 60 to the cylinder 53 of valve 50. The pump 82 is able to provide the increase and to effect a flow rate for pitch-increase to correct a moderate overspeed without the aid of pump 87.

As stated before, when feathering is demanded both pumps are discharging into the line. The engine being idle, windmilling of the propeller takes place during the shift into full-feathering. Windmilling causes the pumps to operate at a speed and to produce oil pressure in excess of normal. Naturally the check valve 104 of unit 90 would open to admit oil at the abnormal pressure to the accumulator; and it would close again when, as the blades approach full-feathering position, the windmilling diminishes and pump pressure falls below accumulator pressure. In order that the accumulator might discharge to complete the feathering operation after pump pressure falls, some means would be required to open the check valve 104 in order to effect a right movement of valve 94 and an effective discharge of the accumulator. The present invention provides means for opening the check-valve 104 in advance of feathering by the operation of the feathering control member and means for holding the check-valve open at least until windmilling had diminished to such extent that pump pressure is less than accumulator pressure. During the period when pump pressure is higher than normal, the accumulator is being charged at this higher pressure so that it is all the more effective to complete the feathering and still has a reserve of pressure for unfeathering. The instant the pump pressure falls below accumulator pressure, check-valve 104 being then held open, the valve 94 of unit 90 immediately moves right to allow the accumulator to discharge freely to complete the feathering operation. Before feathering is completed (30° before in the disclosed apparatus), the mechanical means which had held the check-valve 104 open is automatically disabled. Therefore, the check-valve 104 will be returned by spring 103 to its seat in advance of return of valve 94 to its seat 97 which happens when feathering is completed and discharge of the accumulator ceases. When the feather control member is moved to unfeathering position, the check-valve 104, is momentarily opened; and, in response thereto, valve 94 automatically moves right to permit the discharge of the accumulator to effect movement of the blades from full feathering at least to such angle that windmilling can take place and the pumps become effective again to restore the blades to the positive control range.

While the embodiment of the present invention as herein disclosed, constitute a preferred form, it is to be understood that other forms might be adopted, all coming within the scope of the claims which follow.

What is claimed is as follows:

1. Propeller pitch control apparatus, the combination with a blade having a rotatably supported root, of an hydraulically operated torque unit for rotating the blade including a cylinder and a piston movable therein, an oil pressure source, a governor having an inlet connected with said source and outlet ports connected respectively with the ends of the cylinder and having a speed responsive valve for controlling the flow of pressure fluid from the inlet to either of said outlet ports, a switch-over valve included in the connections between the governor and the cylinder and providing in one position for control of oil pressure to the torque unit in the positive-pitch range and, in the other position which reverses the connections between the governor and the cylinder, for control of oil pressure to the torque unit in the negative-pitch range, means for moving the governor valve in position for connecting the pitch-increasing governor port with the pressure source and for retaining the valve in said position, means for effecting movement of the switch-over valve and the operation of the governor valve retainer to obtain a shift from one pitch range to the other, and means for rendering the retaining means non-operative when the shift from one range to the other has been accomplished.

2. Propeller pitch control apparatus, the combination with a blade having a rotatably supported root, of an hydraulically operated torque unit for rotating the blade including a cylinder and a piston movable therein, an oil pressure source, a governor having an inlet connected with said source and outlet ports connected respectively with the ends of the cylinder and having a speed responsive valve for controlling the flow of pressure-fluid from the inlet to either of said outlet ports, a switch-over valve included in the connections between the governor and the cylinder and providing in one position for control of the torque unit in the positive-pitch range and, in the other position which reverses the connections between the governor and the cylinder, for control of the torque unit in the negative-pitch range, a device for moving the governor valve from a governing position controlling the pitch-increasing and pitch-decreasing ports of the governor into a position connecting only the pitch-increasing port with the pressure source, a controller having means for selecting the positive or the negative-range of control and operable manually for effecting a shift of the switch-over valve and the functioning of the governor-valve-moving device when a shift of the blades from one range into the other is required, said controller having means for rendering said device inoperative operating automatically in response to the shift of the blades from one range into the other.

3. Propeller pitch control apparatus, the combination with a blade having a rotatably supported root, of an hydraulically operated torque unit for rotating the blade including a cylinder and a piston movable therein, an oil pressure source, a governor having an inlet connected with said source and outlet ports connected respectively with the ends of the cylinder and having a speed responsive valve for controlling the flow of pressure fluid from the inlet to either of said outlet ports, a switch-over valve included in the connections between the governor and the cylinder and providing in one position for control of the blade pitch in the positive-pitch range and, in the other position which reverses the connections between the governor and the cylinder, for control of the blade pitch in the negative-pitch range, a device for moving the governor valve from a governing position controlling the pitch-increasing and pitch-decreasing ports of the governor into a position connecting only the pitch-increasing port with the pressure source, a controller having a cam follower and means for selecting the positive or the negative range of control and operable manually for effecting a shift of the switch-over valve and the functioning of the governor-valve-moving device when a shift of the blades from one range into the other is required, said controller having means controlled by the cam-follower for timing the functioning of the governor-valve moving device, and a cam operated by the torque unit for actuating the cam-follower and having a contour such that said device is rendered inoperative automatically in response to the shift of the blades from one range into the other, said cam having a contour such that said device becomes effective to move the governor valve into position for blocking the pitch-decreasing port of the governor when predetermined limits for positive or for negative governed pitch are reached.

4. Propeller pitch control apparatus, the combination of a hub having a tubular part adapted to be drivingly supported and having a plurality of radially disposed blade sockets, propeller blades journalled in the sockets for pitch shifting movement, fluid-pressure operated torque units within the sockets for rotating each of the respective blades, means including a gear concentric with the hub tubular part for correlating the turning movement of said blades, a control cam unit supported and driven by said gear, a regulator assembly comprising an annular housing surrounding said hub tubular part, said housing including a non-rotating tubular wall surrounding the said tubular part of the hub and other wall members rotatively connected with the hub, said other wall members including a plate, said housing providing an oil reservoir, controlling devices supported by the plate and including a governor operative to control the torque units either in the positive or in the negative range of pitch control, means for controlling blade shift from one range into the other and having a manually operable control member for effecting the shift from one range to the other and the non-functioning of governor during the shift and having an automatically operated control member for restoring the operation of the governor after the shift has been completed, a member operated by the cam unit for operating the governor restoring control member, and manually operable means for adjusting the governor.

5. Propeller pitch control apparatus, the combination of a hub having a tubular part adapted to be drivingly supported and having a plurality of radially disposed blade sockets, propeller blades journalled in the sockets for pitch shifting movement, fluid-pressure operated torque units within the sockets for rotating each of the respective blades, means including a gear concentric with the hub tubular part for correlating the turning movement of said blades, a control cam unit supported and driven by said gear, a regulator assembly comprising an annular housing surrounding said hub tubular part, said housing including a non-rotating tubular wall surrounding the hub tubular part, and other wall members rotatively connected with the hub, said other wall members including a plate, said housing providing an oil reservoir, fluid-pressure supply means supported by the plate, supply means actuating mechanism actuated by rotation of housing, an accumulator supported by the hub and charged by the pressure supply means, controlling devices supported by the plate including a governor normally operative to control the torque units either in the positive or in the negative range of pitch control, manually operable means for adjusting the governor to vary the control within the positive or negative ranges and for conditioning the governor for feathering, an accumulator control valve supported by the plate and having a check valve controlling a passage through which oil flows into the accumulator, said check valve normally closing when accumulator pressure substantially equals supply pressure, and having a discharge port and a valve controlling said port, and means for automatically opening the discharge-port-controlling valve in response to mechanically opening the check valve when accumulator pressure exceeds supply pressure, a mechanism operated by the governor adjusting means when in feathering position for positively opening said check valve, means under control by the cam unit for so controlling the mechanism as to hold the check valve open until after the pressure of the supply means is lower than accumulator pressure, means for controlling blade shift from one range of control into the other and having a manually operable control member for effecting the shift from one range to the other and the non-functioning of governor during the shift and having an automatically operated control member for restoring the operation of the governor after the shift has been completed, a member operated by the cam unit for operating the governor restoring control member.

6. Propeller pitch control apparatus, the combination of a hub having a tubular part adapted to be drivingly supported and having a plurality of radially disposed blade sockets, propeller blades journaled in the sockets for pitch shifting movement, fluid-pressure operated torque units within the sockets for rotating each of the respective blades, means including a gear concentric with the hub tubular part for correlating the turning movement of said blades, a control cam unit supported and driven by said gear, a regulator assembly comprising an annular housing surrounding said hub tubular part, said housing including a non-rotating tubular wall surrounding the hub tubular part, and other wall members rotatively connected with the hub, said other wall members including a plate, said housing providing an oil reservoir, fluid-pressure supply means supported by the plate, supply means actuating mechanism actuated by rotation of the housing, an accumulator supported by the hub, controlling devices supported by the plate including a governor having pitch increasing and decreasing ports connected with the torque units and having a speed responsive valve controlling flow from the supply means through said ports, said governor also having a spring for variably controlling the valve, manually operable means for varying the control by the spring and having a feathering status wherein the spring is caused to hold the valve in position for opening the pitch-increasing port, an accumulator control valve having a passage through which oil flows into the accumulator, a check valve for normally closing the passage when accumulator pressure substantially equals supply pressure, and having a discharge port and a valve controlling said port and means for automatically opening the discharge-port-controlling valve in response to mechanically opening the check valve when accumulator pressure exceeds supply pressure, a mechanism operated by the governor-spring-control means when moved into feathering status for positively opening said check valve, and means under control by the cam unit for so controlling the mechanism as to hold the check valve open until after the pressure of the supply means is lower than accumulator pressure.

7. Propeller pitch control apparatus, the combination of a hub having blade sockets, blades supported by the sockets, hydraulically operated means for adjusting the pitch of the blades, fluid-pressure supply means, a governor having a fluid-pressure inlet and outlets connected with the pitch-adjusting means, and having a speed responsive valve for controlling connections between the inlet and outlets, a spring for opposing the action of centrifugal force upon the valve, a lever attached to the valve and supporting the spring, manually operable means for adjusting the leverage of the spring relative to the valve to obtain governed pitch within a normal range and movable to feathering status for causing the spring to position the valve for opening the pitch-increasing valve-outlet, an accumulator, means for connecting the accumulator with the supply means and governor inlet and including a valve unit having an inlet through which pressure fluid flows into the accumulator, a check valve actuated by accumulator pressure to close the inlet, said valve unit including an outlet passage, a valve normally closing the outlet passage, means rendered effective by opening the check-valve when accumulator pressure exceeds supply pressure for causing said outlet valve to open, means for mechanically opening the check-valve and including a cam-follower, a reciprocable cam for engaging the follower in either direction of cam movement to open the check-valve momentarily, a member actuated in one direction by the movement of the governor spring control means into feathering status and in the opposite direction during return of the governor spring control means to normal status, a lost-motion connection between the member and the cam, a spring for taking up the lost motion and for transmitting movement in the direction first mentioned from the member to the cam, a stop for limiting movement of the cam in the direction first mentioned to such position that the cam-follower is caused to hold the check-valve open, and means responsive to the turning of the blades into partially feathered status for effecting retraction of the stop.

8. Propeller pitch control apparatus, the combination of a hub having blade sockets, blades rotatably supported by the sockets, hydraulically operated means for adjusting the pitch of the blades, fluid-pressure supply means, a governor having a fluid pressure inlet and outlets connected with the pitch-adjusting means, and having a speed responsive valve for controlling connections between the inlet and outlets, a spring for opposing the action of centrifugal force upon the valve, a lever attached to the valve and supporting the spring, manually operable means for adjusting the leverage of the spring relative to the valve to obtain governed pitch within a normal range and movable to feathering status for causing the spring to position the valve for opening the pitch-increasing valve outlet, an accumulator, means for connecting the accumulator with the supply means and governor inlet and including a valve unit having an inlet through which pressure fluid flows into the accumulator, a check valve actuated by accumulator pressure to close the inlet, said valve unit including an outlet passage, a valve normally closing the outlet passage, means rendered effective by opening the check-valve when accumulator pressure exceeds supply pressure for causing said outlet valve to open, means for mechanically opening the check valve and including a cam and a cam-follower lever engageable with the check valve, a spring for returning the lever to non-operating position when not engaged by the cam, a member supporting the cam and connected therewith by a pin-and-slot lost-motion connection, a spring for taking up the lost motion, means operated by the manually-operated-governor-spring-control means for moving said members to effect, through the movement of the cam in either direction, the momentary opening of the check valve, a stop for arresting movement of the cam, when, during movement of governor-spring control means into feathering status, the cam has arrived in a position for opening the check valve, and means responsive to the turning of the blades into partially feathered status for effecting retraction of the stop.

9. Propeller pitch control apparatus comprising the combination with a blade having a rotatably supported root, of an hydraulically operated torque unit for rotating the blade including a cylinder and a piston movable therein, a main oil pressure pump, a pressure-oil line connected with the pump outlet, an auxiliary pump, a governor having an intake port connected with the oil line and outlet ports connected with the torque units on opposite sides of its piston, and having a valve responsive to speed for controlling the distribution of pressure oil to the outlet ports, a spring for resisting movement of the valve by centrifugal force, a pressure regulator for limiting the pressure in the oil line to values increasing as propeller speed increases, means responsive to flow of oil for the pitch-increasing function to increase the pressure limits of the pressure regulator, means responsive to decrease of line pressure below the pressure limits set by the pressure regulator for causing the auxiliary pump to force oil into the line, said decrease being in response to a relatively wide opening of either of the outlet ports of the governor, means for reversing connections between the governor outlet ports and the torque unit cylinder when the shift between the positive and negative pitch ranges is required, means for temporarily positioning the speed responsive valve to fully open the pitch increasing port whereby shift from one pitch range to the other is effected by oil flow from both pumps, said temporary positioning means becoming inactive in response to completion of shift, a pressure-oil accumulator charged from the line and supplying the pressure for completion of feathering and for unfeathering, a flow actuated valve responsive to accumulator charge for controlling the discharge of the accumulator, manually operable means for conditioning the governor spring for variably opposing centrifugal force acting upon the valve in order to vary the governed speed and to condition the spring for moving the governor valve into position for wide opening of the pitch increasing port of the governor for feathering whereby, during a portion of the pitch change from the governed positive pitch range to full feathering, the accumulator is charged by both pumps until pump pressure falls below accumulator pressure, and thereafter the accumulator supplies the pressure to complete feathering, a valve effective upon completion of feathering for preventing further discharge from the accumulator, and means actuated upon movement of said manually operable means from feathering position to a positive governed pitch position for effecting discharge of the accumulator through said valve for unfeathering purposes.

10. Propeller pitch control apparatus comprising the combination with a blade having a rotatably supported root, of an hydraulically operated torque unit for rotating the blade including a cylinder and a piston movable therein, a main oil-pressure pump, a pressure-oil line connected with the pump outlet, an auxiliary pump, a governor having an intake port connected with the oil line and outlet ports connected with the torque unit on opposite sides of its piston, and having a valve responsive to speed for controlling the distribution of pressure oil to the outlet ports, a spring resisting movement of the valve by centrifugal force, manually operable means for conditioning the spring for variably opposing centrifugal force acting upon the valve in order to vary the governed speed, a pressure regulator for limiting the pressure in the oil line to values increasing as propeller speed increases, means responsive to flow of oil for the pitch-increasing function to increase the pressure limits of the pressure regulator, means including a pump control valve having a piston face exposed to the excess flow from said pressure regulator and responsive to decrease of line pressure below the pressure limits set by the pressure regulator for causing the auxiliary pump to force oil into the line, said decrease being in response to a relatively wide opening of either of the outlet ports of the governor.

11. Propeller pitch control apparatus comprising the combination with a blade having a rotatably supported root, of an hydraulically operated torque unit for rotating the blade including a cylinder and a piston movable therein, a main oil pressure pump, a pressure oil line connected with the pump outlet, an auxiliary pump, a governor having an intake port connected with the oil line and outlet ports connected with the torque unit on opposite sides of its piston, and having a valve responsive to speed for controlling the distribution of pressure oil to the outlet ports, a spring resisting movement of the valve by centrifugal force, manually operable means for conditioning the spring for variably opposing centrifugal force acting upon the valve in order to vary the governed speed, a pressure regulator for limiting the pressure in the oil line to values increasing as propeller speed increases, means responsive to flow of oil for the pitch increasing function to increase the pressure limits of the pressure regulator, means responsive to decrease of line pressure below the pressure limits set by the pressure regulator for causing the auxiliary pump to force oil into the line, said decrease being in response to a relatively wide opening of either of the outlet ports of the governor, means for reversing connections between the governor outlet ports and the torque unit cylinder when the shift between the positive and negative pitch ranges is required, means for temporarily positioning the governor valve to fully open the pitch increasing port whereby shift from one pitch range to the other is effected by oil flow from both pumps, said temporary positioning means becoming inactive in response to completion of shift.

12. Propeller pitch control apparatus comprising the combination with a blade having a rotatably supported root, of an hydraulically operated torque unit for rotating the blade including a cylinder and a piston movable therein, a main oil pressure pump, a pressure oil line connected with the pump outlet, an auxiliary pump, a governor having an intake port connected with the oil line and outlet ports connected with the torque unit on opposite sides of its piston, and having a valve responsive to speed for controlling the distribution of pressure oil to the outlet ports, a spring resisting movement of the valve by centrifugal force, a pressure regulator for limiting the pressure in the oil line to values increasing as propeller speed increases, means responsive to flow of oil for the pitch increasing function to increase the pressure limits of the pressure regulator, means responsive to decrease of line pressure below the pressure limits set by the pressure regulator for causing the auxiliary pump to force oil into the line, said decrease being in response to a relatively wide opening of either of the outlet ports of the governor, a pressure oil accumulator charged from the line and supplying the pressure for completion of feathering and for unfeathering, valve means subject to the opposed pressures of the line and the accumulator for controlling the accumulator discharge, manually operable means for conditioning the governor spring for variably opposing centrifugal force acting upon the valve in order to vary the governed speed and to condition the spring for moving the governor valve into position for wide opening of the pitch increasing port of the governor for feathering whereby, during a portion of the pitch change from the governed positive pitch range to full feathering, the accumulator is charged by both pumps until pump pressure falls below accumulator pressure, and thereafter the accumulator supplies the pressure to complete feathering, a valve effective upon completion of feathering for preventing further discharge from the accumulator, and means actuated upon movement of said manually operable means from feathering position to a positive governed pitch position for effecting discharge of the accumulator through said valve for unfeathering purposes.

13. Propeller pitch control apparatus comprising the combination with a blade having a rotatably supported root, of an hydraulically operated torque unit for rotating the blade including a cylinder and a piston movable therein, a main oil pressure pump, a pressure oil line connected with the pump outlet, an auxiliary pump, a governor having an intake port connected with the oil line and outlet ports respectively connected with the torque unit on opposite sides of its piston, and having a valve responsive to speed for controlling the distribution of pressure oil to the outlet ports, a spring resisting movement of the valve by centrifugal force, manually operable means for conditioning the spring for variably opposing centrifugal force acting upon the valve in order to vary the governed speed, a pressure regulator for limiting the pressure in the oil line to values increasing as propeller speed increases, said pressure regulator having means providing for the escape of oil from the line when line pressure tends to exceed the limits set by the regulator at various speeds, and blocking the escape of oil when the line pressure falls below said limits, and means including a pump control valve having a piston face exposed to the excess flow from said pressure regulator and responsive to said escape of oil from the line for causing the opening of a by-pass from the outlet of the auxiliary pump to drain whereby the auxiliary pump runs idle, said last named means operating to close the by-pass when oil ceases to escape from the line and whereby the auxiliary pump forces oil into the line.

14. Propeller pitch control apparatus comprising the combination with a blade having a rotatably supported root, of an hydraulically operated torque unit for rotating the blade including a cylinder and a piston movable therein, a main oil pressure pump, a pressure oil line connected with the pump outlet, an auxiliary pump, a governor having an intake port connected with the oil line and outlet ports connected with the torque unit on opposite sides of its piston, and having a valve responsive to speed for controlling the distribution of pressure oil to the outlet ports, a spring resisting movement of the valve by centrifugal force, manually operable means for conditioning the spring for variably opposing centrifugal force acting upon the valve in order to vary the governed speed, a pressure regulator for limiting the pressure in the oil line to values increasing as propeller speed increases, said pressure regulator having means providing for the escape of oil from the line when line pressure tends to exceed the limits set by the regulator at various speeds, and blocking the escape of oil when the line pressure falls below said limits, and a valve for controlling a by-pass from the outlet of the auxiliary pump to drain and actuated by pressure of oil escaping at the pressure regulator to open the by-pass and operating when the escape ceases to close the by-pass.

15. Propeller pitch control apparatus comprising the combination with a blade having a rotatably supported root, of an hydraulically operated torque unit for rotating the blade including a cylinder and a piston movable therein, a main oil pressure pump, a pressure oil line connected with the pump outlet, an auxiliary pump, a governor having an intake port connected with the oil line and outlet ports connected with the torque unit on opposite sides of its piston, and having a valve responsive to speed for controlling the distribution of pressure oil to the outlet ports, a spring resisting movement of the valve by centrifugal force, manually operable means for conditioning the spring for variably opposing centrifugal force acting upon the valve in order to vary the governed speed, a pressure regulator for limiting the pressure in the oil line to values increasing as propeller speed increases, means responsive to the flow of oil for the pitch increasing function to increase the pressure limits of the regulator, the pressure limit increase increasing with speed increase, said pressure regulator having means providing for the escape of oil from the line when line pressure tends to exceed the limits set by the regulator and blocking the escape of oil when the line pressure falls below said limits, the pressure of the escaping oil increasing with the pressure limit increase due to flow of oil for the pitch increasing function, and a valve for controlling a by-pass from the outlet of the auxiliary pump to drain and being under the control of centrifugal force opposed by the force of oil escaping at the regulator whereby, when the force of escaping oil exceeds centrifugal force the valve is positioned to open the by-pass and whereby, when said oil force is less than said centrifugal force, the valve moves to close the by-pass.

16. Propeller pitch control apparatus comprising the combination with a blade having a rotatably supported root, of an hydraulically operated torque unit for rotating the blade including a cylinder and a piston movable therein, a main oil pressure pump, a pressure oil line connected with the pump outlet, an auxiliary pump, a governor having an intake port connected with the oil line and outlet ports connected with the torque unit on opposite sides of its piston, and having a valve responsive to speed for controlling the distribution of pressure oil to the outlet ports, a spring resisting movement of the valve by centrifugal force, manually operable means for conditioning the spring for variably opposing centrifugal force acting upon the valve in order to vary the governed speed, means including a pump control valve having a piston face exposed to the excess flow from said pressure regulator and rendered effective in response to a substantial opening of the outlet ports of the governor in response to a relatively large speed error for causing the auxiliary pump to force oil into the line in order to obtain the flow rate to the torque unit required for rapid speed-correction.

17. In a hydraulic system for control of blade pitch of a variable pitch propeller, the combination comprising, a blade actuating servo-motor, a governor valve for application of fluid pressure to the servo-motor, a source of fluid pressure for the system including a pump providing a surplus of fluid under pressure beyond what is normally needed by the governor for application to the servo-motor, pressure control means for regulating the pressure of said source including an auxiliary pump and a pressure control valve for controlling the delivery of said auxiliary pump, means connecting the pressure control valve with the source for diverting a surplus of fluid over what is normally required to be applied to the servo-motor by the governor, and means including the pressure control valve for connecting the auxiliary pump with the source in response to diminution of surplus fluid diverted by said pressure control valve.

18. In a hydraulic system for control of blade pitch of a variable pitch propeller, the combination comprising, a blade actuating servo-motor, a governor valve for application of fluid pressure to the servo-motor, selective means for setting the governor valve to effect governed positive, negative, and feathering pitch conditions requiring a wide range of pressure applications to the servo-motor, a source of fluid pressure for the system including a pump providing a surplus of fluid under pressure beyond what is normally needed by the governor for effecting governed positive pitch, pressure control means for regulating the potential of pressure delivered to the servo-motor including a pressure control valve for diverting the surplus of fluid under pressure from said pump from that needed by the governor, means responding to the fluid pressure applied to the servo-motor and biasing the pressure control valve for reducing the amount of surplus fluid under pressure diverted by the pressure control valve, an additional pump, and valve means responding to absence of surplus fluid diverted by said pressure control valve for connecting said additional pump to said source of fluid pressure.

19. In a control system for a hydraulically operated controllable pitch propeller capable of reverse blade pitch adjustment, a speed sensitive governor, a valve normally operated by said governor to control hydraulic fluid flow to said propeller for normal pitch adjustment thereof to constant speed operation, a manually operated reverse pitch selector, means operated by said selector to reverse the sense of said propeller pitch change relative to said governor controlled valve, and means operated by said selector to overcome governor control of said valve and to adjust said valve toward an open position, allowing fluid flow to the propeller for continued pitch decrease thereof, past zero pitch into a negative pitch setting, said propeller having a negative pitch limit, and means responsive to said propeller reaching the negative pitch limit to restore governor control to said propeller in the reverse sense effected by said selector.

20. In a control system for a hydraulically operated controllable pitch propeller capable of reverse blade pitch adjustment, a speed sensitive governor, a valve normally operated by said governor to control hydraulic fluid flow to said propeller for normal pitch adjustment thereof to constant speed operation, a manually operated reverse pitch selector, means operated by said selector to reverse the sense of said propeller pitch change relative to said governor controlled valve, and means operated by said selector to overcome governor control of said valve and to adjust said valve toward an open position, allowing fluid flow to the propeller for continued pitch decrease thereof, past zero pitch into a negative pitch setting, said propeller having a negative pitch limit, means responsive to said propeller reaching the negative pitch limit to restore governor control to said propeller in the reverse sense effected by said selector, said selector, upon later adjustment thereof to normal operation, being effective to restore said governor valve to normal positive pitch sensing with concurrent overcoming of said governor controlled valve while propeller pitch is returning to positive from negative pitch.

21. In a control system for a hydraulically operated controllable pitch propeller capable of reverse blade pitch adjustment, a speed sensitive governor, a valve normally operated by said governor to control hydraulic fluid flow to said propeller for normal pitch adjustment thereof to constant speed operation, a manually operated reverse pitch selector, valve means operated by said selector to reverse the sense of said propeller pitch change relative to said governor controlled valve, and linkage means coincidentally operated by said selector to adjust said governor valve toward an open position regardless of governor demanded positioning thereof allowing fluid flow to the propeller for continued pitch decrease thereof, past zero pitch into a negative pitch setting.

22. In combination, a propeller having variable pitch blades and having a normal pitch range and a reverse pitch position, a fluid operated pitch changing motor therefor, a source of fluid pressure, a governor controlling admission of fluid from said source to said motor to vary the pitch of said blades in said normal operating range, means connecting said source with said motor in said reverse pitch position including means directing fluid from said source to said motor to maintain said blades in reverse pitch position, a separate source of fluid pressure and means, including means disabling said governor, for directing fluid from said separate source to said motor to move said blades from the reverse pitch position into said normal range, and means actuated by the unreversing movement of said motor at a preselected point in said unreversing movement for automatically interrupting the supply of fluid from said separate source to said motor and automatically restoring control to said governor.

References Cited in the file of this patent

UNITED STATES PATENTS

| Number | Name | Date |
|---|---|---|
| 2,216,416 | Mader | Oct. 1, 1940 |
| 2,280,714 | Martin | Apr. 21, 1942 |
| 2,296,288 | Martin et al. | Sept. 22, 1942 |
| 2,306,953 | Jung | Dec. 29, 1942 |
| 2,307,102 | Blanchard et al. | Jan. 5, 1943 |
| 2,307,849 | Mullen | Jan. 12, 1943 |
| 2,338,483 | Beebe | Jan. 4, 1944 |
| 2,343,382 | Martin | Mar. 7, 1944 |
| 2,343,416 | Keller | Mar. 7, 1944 |
| 2,353,566 | Keller | July 11, 1944 |
| 2,361,954 | Martin | Nov. 7, 1944 |
| 2,391,699 | Haines et al. | Dec. 25, 1945 |
| 2,402,065 | Martin | June 11, 1946 |